(12) United States Patent
Ilami et al.

(10) Patent No.: US 10,609,537 B2
(45) Date of Patent: Mar. 31, 2020

(54) PROXIMITY PLATFORM

(71) Applicant: Microsoft Technology Licensing, LLC, Redmond, WA (US)

(72) Inventors: Steven Mathew Ilami, Seattle, WA (US); Heming Wen, Bellevue, WA (US); Artur Moura Aguiar, Redmond, WA (US); Matthew Thomas Beaver, Seattle, WA (US); Frank Gorgenyi, Bremerton, WA (US); Robert Zi Long Zhao, Brooklyn, NY (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 15/859,099

(22) Filed: Dec. 29, 2017

(65) Prior Publication Data
US 2019/0159000 A1 May 23, 2019

Related U.S. Application Data

(60) Provisional application No. 62/590,022, filed on Nov. 22, 2017, provisional application No. 62/590,164, filed on Nov. 22, 2017.

(51) Int. Cl.
*H04B 7/00* (2006.01)
*H04W 4/80* (2018.01)
*G06Q 30/02* (2012.01)
*H04W 8/00* (2009.01)
(Continued)

(52) U.S. Cl.
CPC .......... *H04W 4/80* (2018.02); *G06Q 30/0251* (2013.01); *H04B 1/3827* (2013.01);
(Continued)

(58) Field of Classification Search
CPC ..... H04W 4/008; H04W 8/005; H04J 3/1605; H04J 3/242
See application file for complete search history.

(56) References Cited

U.S. PATENT DOCUMENTS

2007/0124459 A1* 5/2007 Kasama ................... G06F 8/61
709/224
2014/0355517 A1* 12/2014 Reunamaki ........... H04W 8/005
370/328
(Continued)

FOREIGN PATENT DOCUMENTS

EP 2922261 A1 9/2015
EP 2956794 A1 12/2015

OTHER PUBLICATIONS

"Non Final Office Action Issued in U.S. Appl. No. 15/858,908", dated Dec. 10, 2018, 10 Pages.
(Continued)

*Primary Examiner* — Tuan Pham
(74) *Attorney, Agent, or Firm* — Mark K. Young; Mayer & Williams PC

(57) ABSTRACT

A host device, such as a laptop or desktop computer, that supports wireless point-to-point connections with a peripheral device, such as a pair of headphones, mouse, etc., is configured with a proximity platform with which services register to execute particular filters or scenarios upon the host device connecting or attempting to connect with a peripheral device. For example, an advertisement packet transmitted from the peripheral device using Bluetooth may be customized with a particular pattern that corresponds to one or more registered patterns from the registered services, thereby causing the proximity platform to perform particular functions. Peripheral devices can thereby customize their products so that a host computer automatically performs a function upon receiving an advertisement from the peripheral device, such as surface a notification on a user interface of the host device or track the peripheral device's location.

7 Claims, 24 Drawing Sheets

(51) Int. Cl.
  *H04B 1/3827* (2015.01)
  *H04W 4/029* (2018.01)
  *H04W 4/20* (2018.01)
  *H04B 17/318* (2015.01)
  *H04W 76/14* (2018.01)
  *H04W 84/18* (2009.01)

(52) U.S. Cl.
  CPC .......... *H04B 17/318* (2015.01); *H04W 4/029* (2018.02); *H04W 4/20* (2013.01); *H04W 8/005* (2013.01); *H04W 76/14* (2018.02); *H04W 84/18* (2013.01)

(56) References Cited

U.S. PATENT DOCUMENTS

| | | | |
|---|---|---|---|
| 2016/0127516 A1* | 5/2016 | Chazot | H04L 69/18 710/11 |
| 2016/0277875 A1 | 9/2016 | Ivanova et al. | |
| 2016/0380778 A1 | 12/2016 | Shen et al. | |
| 2017/0075405 A1 | 3/2017 | Jensen et al. | |
| 2017/0105096 A1* | 4/2017 | Olson | H04B 17/318 |
| 2017/0281060 A1 | 10/2017 | Wedekind et al. | |
| 2018/0115540 A1* | 4/2018 | Moiyallah, Jr. | H04L 63/08 |
| 2018/0132287 A1 | 5/2018 | Cheng et al. | |
| 2019/0158999 A1 | 5/2019 | Ilami et al. | |
| 2019/0349736 A1 | 11/2019 | Ilami et al. | |

OTHER PUBLICATIONS

"International Search Report and Written Opinion Issued in PCT Application No. PCT/US18/060207", dated Feb. 14, 2019, 12 Pages.

"International Search Report and Written Opinion Issued in PCT Application No. PCT/US2018/060208", dated May 9, 2019, 20 Pages.

* cited by examiner

200

350

300

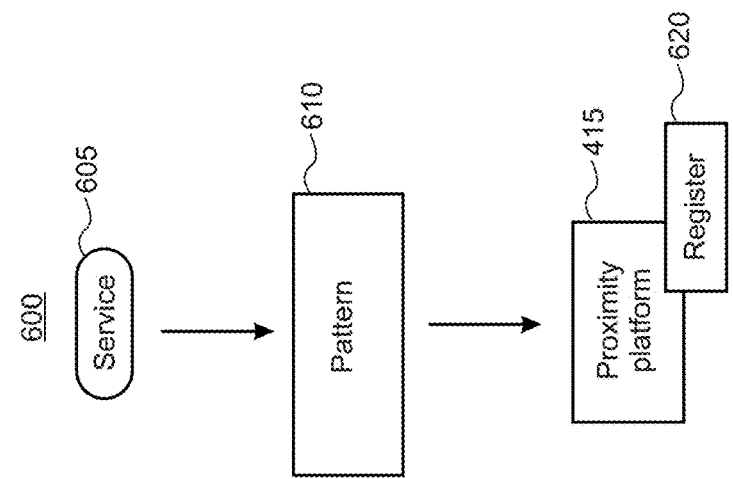
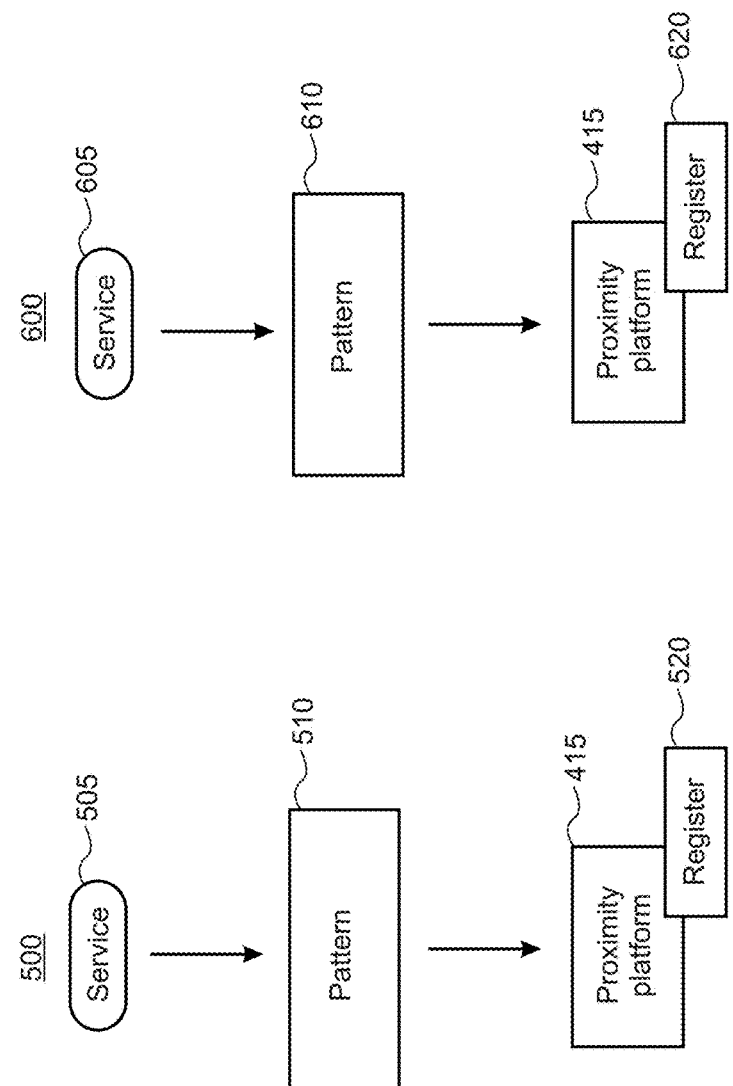
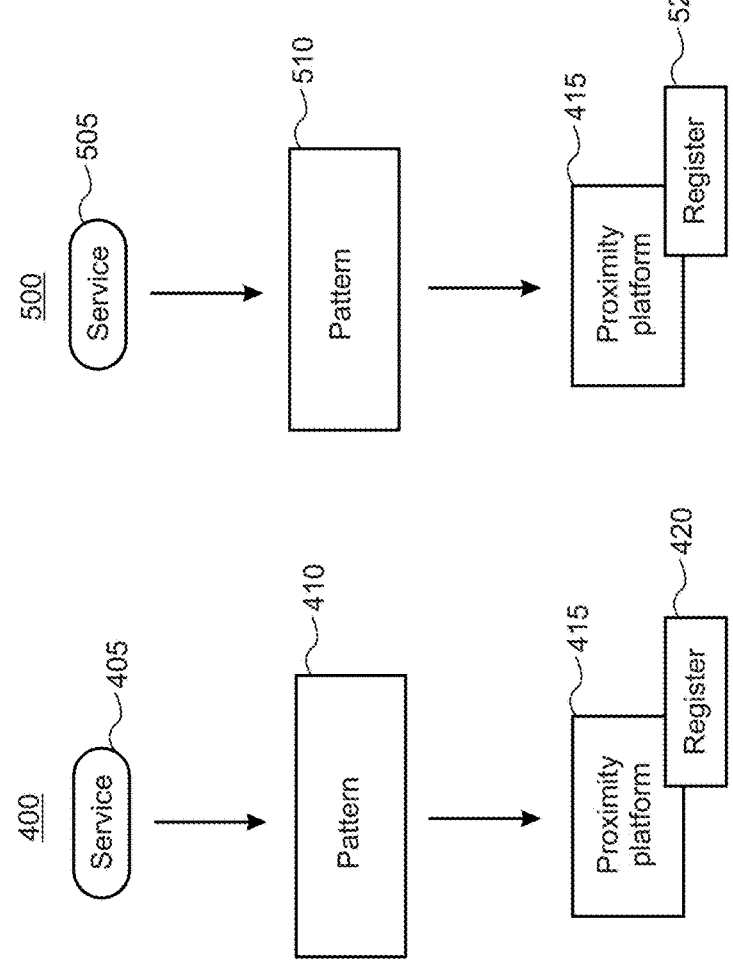

800

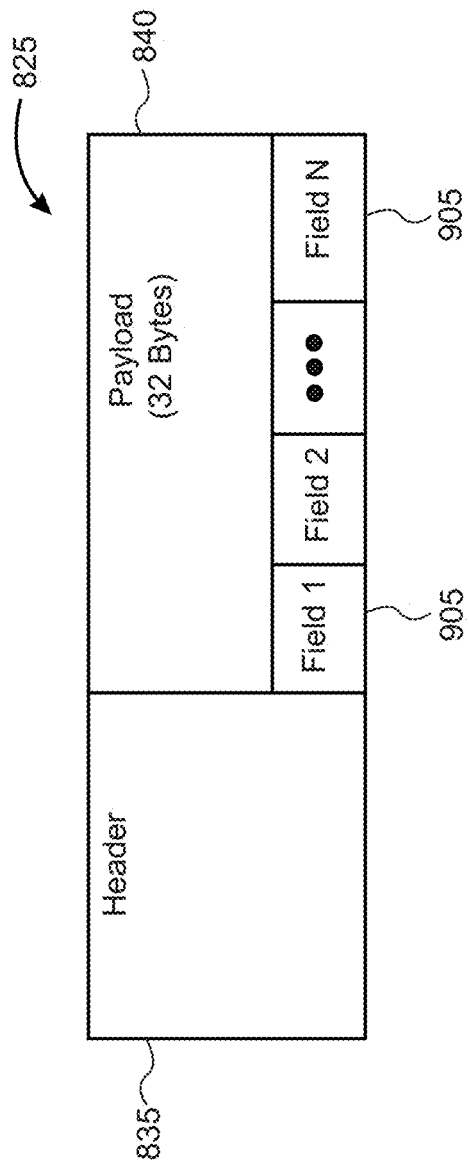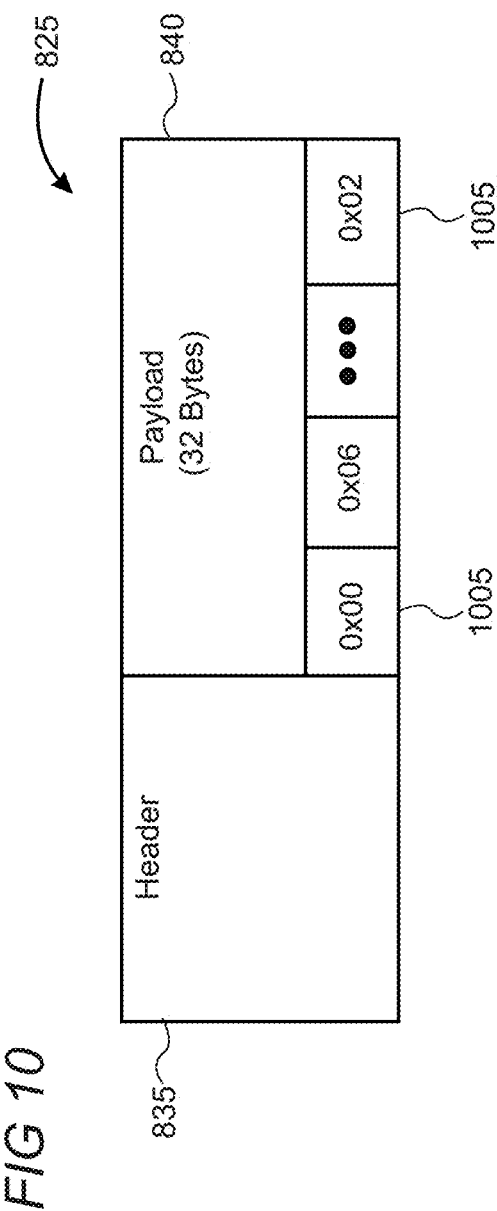

1100

1200

1800

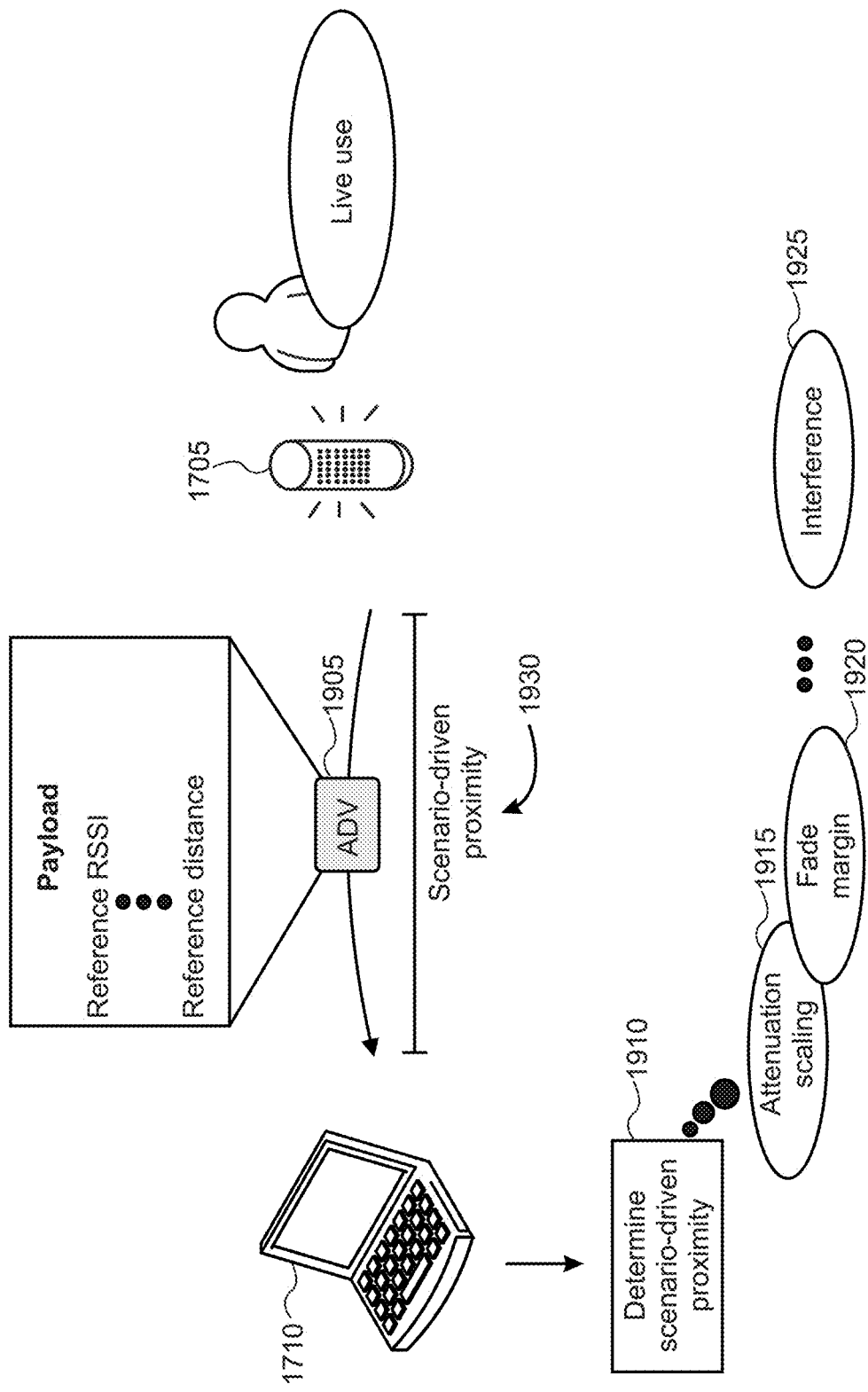

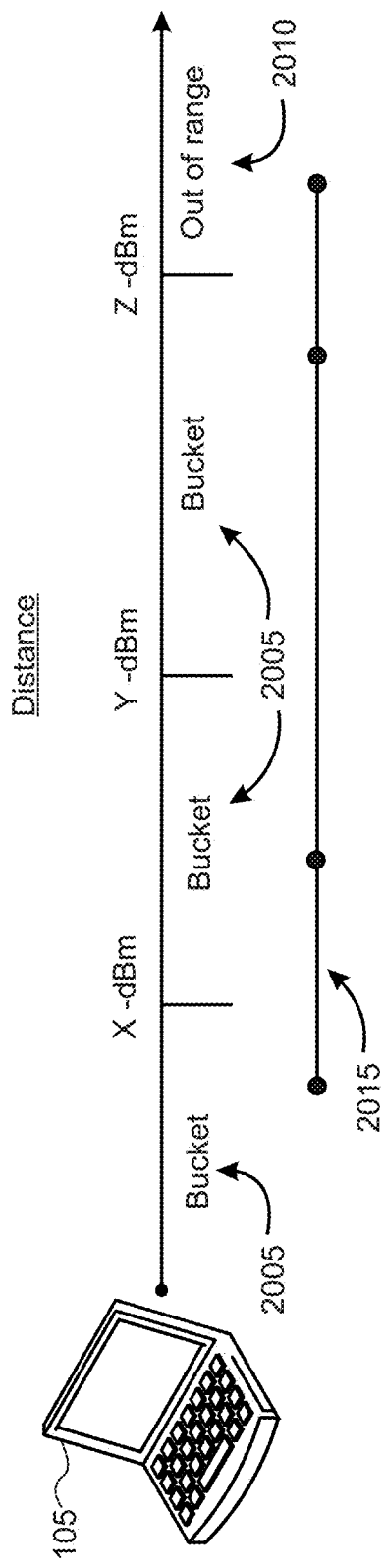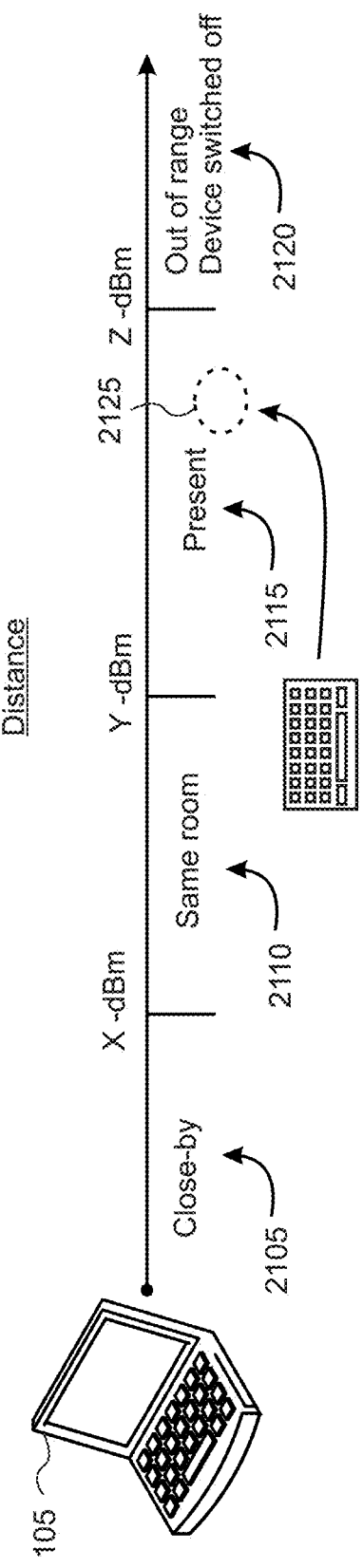

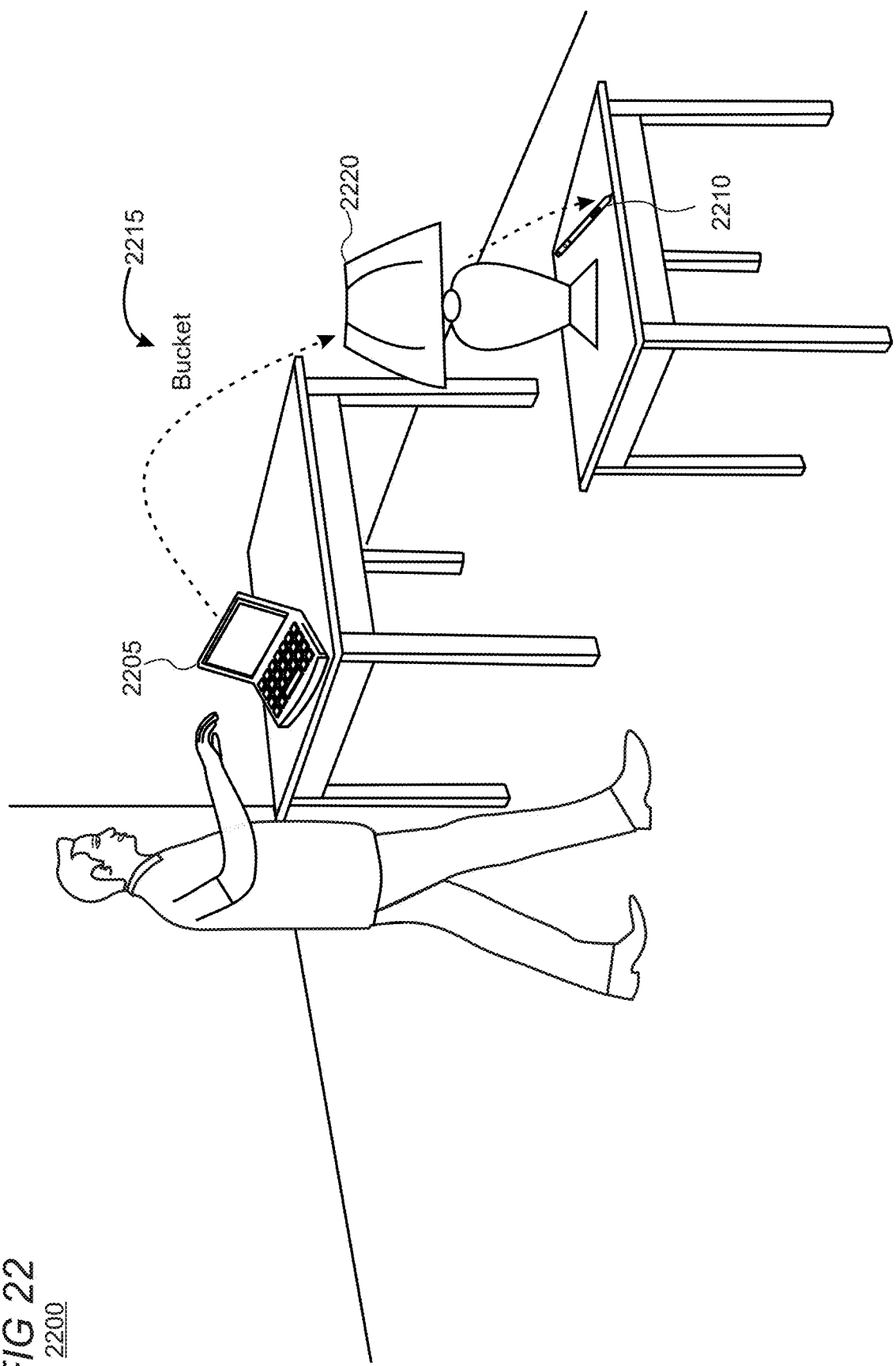

2300

2400

2500

2700

PROXIMITY PLATFORM

CROSS-REFERENCE TO RELATED APPLICATIONS

This application claims benefit and priority to U.S. Provisional Application Ser. No. 62/590,022 filed Nov. 22, 2017, entitled "PROXIMITY PLATFORM" which is incorporated herein by reference in its entirety. This patent application is related to co-pending application with a U.S. Ser. No. 15/858,908 entitled "QUICK PAIR," filed contemporaneously herewith on Dec. 29, 2017, which claims benefit and priority to U.S. Provisional Application Ser. No. 62/590,164 filed Nov. 22, 2017, the entire contents of both applications are incorporated herein by reference in their entirety.

BACKGROUND

Host computing devices (e.g., smartphone, desktop computer, and laptop) utilize numerous peripheral computing devices (e.g., speakers, mice, and keyboard) to provide additional features and experiences to users. Connection mechanisms and protocols between host and peripheral devices can vary, and at times the interaction with the host device can be burdensome to users even after a connection has been established.

SUMMARY

A proximity platform instantiated on a host computing device is utilized to centralize detection and tracking of wireless peripheral devices within a proximity platform client on an operating system (OS) of the host device. Various services or applications associated with the host device can register patterns with the proximity platform, in which individual patterns represent details about a peripheral device or operations or functions to perform when a particular peripheral device, category of peripheral devices, or group of peripheral devices connect to the host device or before the peripheral and host devices establish a connection. Groups or categories of peripheral devices can be broken down by manufacturer, type of device (e.g., speaker, headphones, keyboard, mouse, etc.), and other groups or categories.

When Bluetooth® technology is utilized (as opposed to other wireless connection protocols), an advertisement packet from the peripheral device is transmitted, broadcasted, or beaconed to the host device, which makes it connectible. Upon the host device detecting the advertisement, the host device can choose to connect to the peripheral device or not, and/or to perform other scenarios within the proximity platform ecosystem. The advertisement includes fields, in octet or byte form, which include patterns within a payload of the advertisement that correspond to one or more registered patterns on the host device. The proximity platform examines the advertisement and, based on detected correspondences between the received payload pattern and the registered patterns, the host device performs the requisite operations, functions, filters, and the like.

In an illustrative example, the proximity platform on the OS can perform functions and apply filters when a payload pattern has been recognized and is associated with a given peripheral device. The proximity platform, for example, can trigger a service to automatically surface a notification on the display, automatically download an application, or automatically initiate an application. The proximity platform can apply scenarios and sub-scenarios, at times using filters and sub-filters, based on the payload pattern. For example, a primary scenario can monitor for the peripheral device to be within a threshold presence of the host device, and a sub-scenario can track the peripheral device to verify it is located within a nearer and pre-set threshold presence to the host device. A scenario or sub-scenario may represent a higher level action to be performed by the host device, and filters or sub-filters may be more specific actions that are performed according to the given scenario. Filters and sub-filters can be used for more than one scenario and sub-scenario and are not necessarily unique to the particular scenario. Scenarios and filters can at times both be particular actions that are detailed in a pattern within the advertisement payload.

The host device may utilize a live RSSI (Received Signal Strength Indication) value determined at the host device and also a calibrated RSSI value received from the peripheral device to identify an accurate or approximate distance or categorical representation of positioning for the peripheral device relative to the host device. The categorical representation of positioning of the peripheral device can, for example, utilize buckets as discussed in more detail below. Calibration values can be used for the peripheral device and in some embodiments for host devices as well (e.g., different host values for different laptops, tablets, PCs, etc.). The calibration can include utilizing prior beacons from a reference peripheral device and reference host devices, at a known reference distance, to determine an accurate distance for the peripheral device. For example, calibration may use one real host device to a reference peripheral device, or it may use one reference host device to a real peripheral device. This way the finalized calibration for a particular device will have taken into account any affects that may result from a legitimate real-world host device and a legitimate real-world peripheral device.

The distance value determined by the host device using the calibration and live RSSI values may not be stored, but rather may be a characteristic of the channel of the remote or host device. The determined distance can be utilized for the various filters and scenarios discussed above, such as tracking the peripheral device and applying certain filters based on the known location of the peripheral device relative to the host device.

The host device may additionally or alternatively utilize pre-determined buckets to perform various functions or filters, in which the buckets represent unique distal parameters based on one or more factors including an RSSI value, the implemented system, form factor, and radio positioning. Some of the factors may be accounted for during calibration. As mentioned above, the buckets may alternatively be considered categorical representations of a particular peripheral device's position. Using the factors, statistical analysis and machine learning can be utilized to determine which bucket an RSSI value belongs to for the system and the peripheral device used.

For example, one bucket may represent that the peripheral device is close to the host device, a second bucket may represent that the peripheral device is within the same room, and a third bucket may represent a maximum distance before the peripheral device becomes out of range. Thus, although different concepts of distance are used for the buckets in this example, other categorical, scenario-driven examples can be associated with particular buckets. Each of these buckets can be associated with the overall tracking of a particular peripheral device, or may otherwise trigger particular actions by the host device according to the payload pattern transmitted from the peripheral device's advertisement.

The proximity platform advantageously concentrates and centralizes functions and filters for peripheral devices that various services within the host device may otherwise perform. This centralization within the OS of the host device saves battery life for the host device, system bandwidth, and processor and memory utilization so that all of these functions are performed by a single client, the proximity platform, within the OS.

The proximity platform serves as an entry point for additional features which services can utilize to improve user experiences and ease of operation with the host and peripheral devices. For example, first and third-party manufacturers of peripheral devices can customize the advertisement payload patterns to utilize the functions and filters created and supported by the host device, thus creating a more consistent, coherent, and user-friendly ecosystem across devices, even among unrelated third-parties. For example, a computer mouse manufacturer and a separate keyboard manufacturer can both utilize the proximity platform of the host device to perform seamless connections and operations with the host device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 4-6 show illustrative environments in which services register patterns with a proximity platform;

FIG. 9 shows illustrative fields associated with a payload of an advertisement within a protocol data unit of the data packet;

FIG. 10 shows an illustrative payload of the advertisement in which the fields contain exemplary patterns;

FIG. 19 shows an illustrative environment in which the laptop computer determines a scenario-driven proximity for the Bluetooth wireless speaker;

FIG. 20 shows an illustrative environment in which buckets are utilized by the host device;

FIG. 21 shows an illustrative environment in which the buckets include particular distance monikers or categorical representations;

FIG. 22 shows an illustrative environment in which the user connects or attempts to connect a wireless electronic stylus pen to a laptop computer through potential interference caused by an object;

Like reference numerals indicate like elements in the drawings. Elements are not drawn to scale unless otherwise indicated.

DETAILED DESCRIPTION

Figure 1:
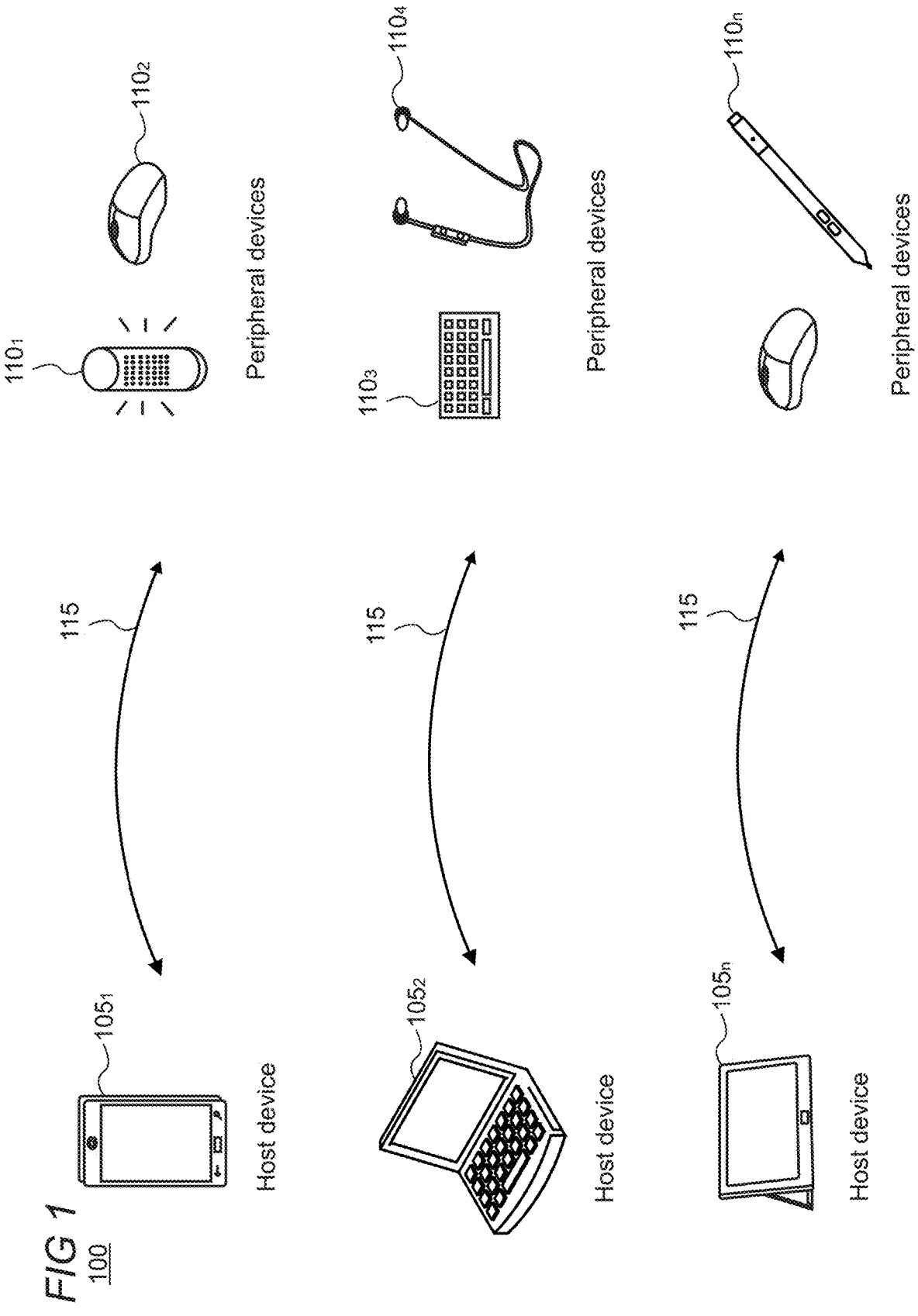
FIG. 1 shows an illustrative wireless connection among host devices and peripheral devices.

FIG. 1 shows an illustrative environment 100 in which various host devices 105 wirelessly connect with respective peripheral devices 110 (double arrowed lines indicate wireless connections as represented by reference numeral 115). In this example, the host devices depict smartphones, laptop computers, and tablet computers, but other host devices may also be utilized such as personal computers (PC), game consoles, and wearable computing devices such as head-mounted displays. Users may employ the host devices to make and receive voice and/or video calls, engage in messaging (e.g., SMS/MMS) and e-mail communications, use applications, play or stream music, movies, and other multimedia, access services that employ data, browse the World Wide Web, and the like.

The peripheral devices 110 depicted in FIG. 1 and paired with respective host devices 105 include various wireless devices including a Bluetooth® speaker, mouse, keyboard, headphones, and a stylus pen configured for use with a touchscreen display. Other wireless peripheral devices not shown in FIG. 1 may also be utilized with the present proximity platform, including remote controls, video game controllers, and chargers. In addition, certain host devices may be considered peripheral devices in some scenarios. For example, a smartphone may be considered a peripheral device when connected to a PC, such as when the smartphone seeks to upload multimedia (e.g., pictures) to the PC for backup. In some scenarios the operations performed between the two devices may dictate the assignment of host (master) and peripheral (slave) devices.

Figure 2:
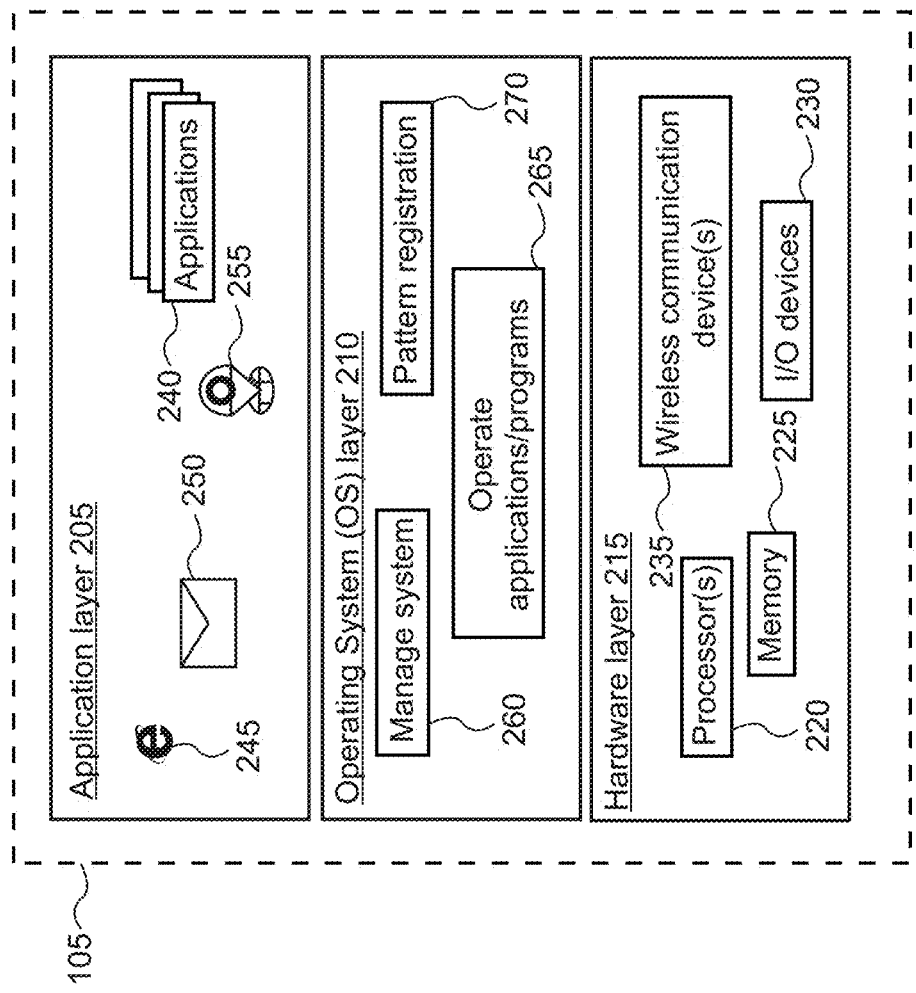
FIG. 2 shows an illustrative architecture of a host computing device.

FIG. 2 shows an illustrative layered architecture 200 of the host computing device 105. The architecture 200 is typically implemented in software, although combinations of software, firmware, and/or hardware may also be utilized in some cases. The architecture is arranged in layers and includes an application layer 205, an OS (operating system) layer 210, and a hardware layer 215. The hardware layer 215 provides an abstraction of the various hardware used by the host device 105 (e.g., input and output devices, networking and radio hardware, etc.) to the layers above it. In this illustrative example, the hardware layer supports processor(s) 220, memory 225, input/output devices (e.g., mouse, keyboard, display) 230, and a wireless communication device 235.

The wireless communication device 235, or transceiver, can include any range of technologies that support the transmission and reception of data over waves, including classic Bluetooth (e.g., Enhanced Data Rate (EDR)), Bluetooth LE (Low Energy), NFC (Near Field Communication), and Wi-Fi. These various wireless connection devices can transmit and receive data over waves, such as radio waves, and do so at particular frequencies according to the protocol for the particular technology. Bluetooth, for example, utilizes 2.4 GHz radio frequency to transmit and receive data among two or more devices, and Wi-Fi can utilize a radio frequency of 2.4, 3.6, or 5.0 GHz.

The wireless communication device 235 can transmit and receive data in the form of, for example, radio waves, in which the device translates the data into radio waves for transmission or breaks down the radio waves into data upon receipt. The wireless communication device may be operatively connected to the processor which transmits data from and to the wireless communication device. The wireless communication device can also monitor signal strength of a connection with a peripheral device in addition to beacons, broadcasts, or transmitted advertisements from the peripheral device. In one example, the device can monitor beacons when the peripheral device is not connected and monitor connections when the peripheral device is connected. The proximity platform is designed to handle both cases.

The application layer 205 in this illustrative example supports various applications 240, including a web browser 245, e-mail application 250, maps application 255, etc. Although only certain applications are depicted in FIG. 2, any number of applications can be utilized by the device, including calendar, contacts, news, fitness, etc. The applications are often implemented using locally executing code. However, in some cases, these applications can rely on services and/or remote code execution provided by remote servers or other computing platforms such as those supported by a service provider or other cloud-based resources (not shown).

The OS layer 210 supports, among other operations, managing system 260, operating applications/programs 265, and pattern registration 270. The OS layer may interoperate with the application and hardware layers to perform various functions and features. Furthermore, although pattern registration is shown as a component within device 105, it may alternatively be, in whole or in part, instantiated on a remote server and communicate with the host device 105 over a network (not shown). The network can include any number of connections which the device and service are a part of, such as a personal area network, local area network, wide area network, the Internet, or the World Wide Web.

Figure 3B:
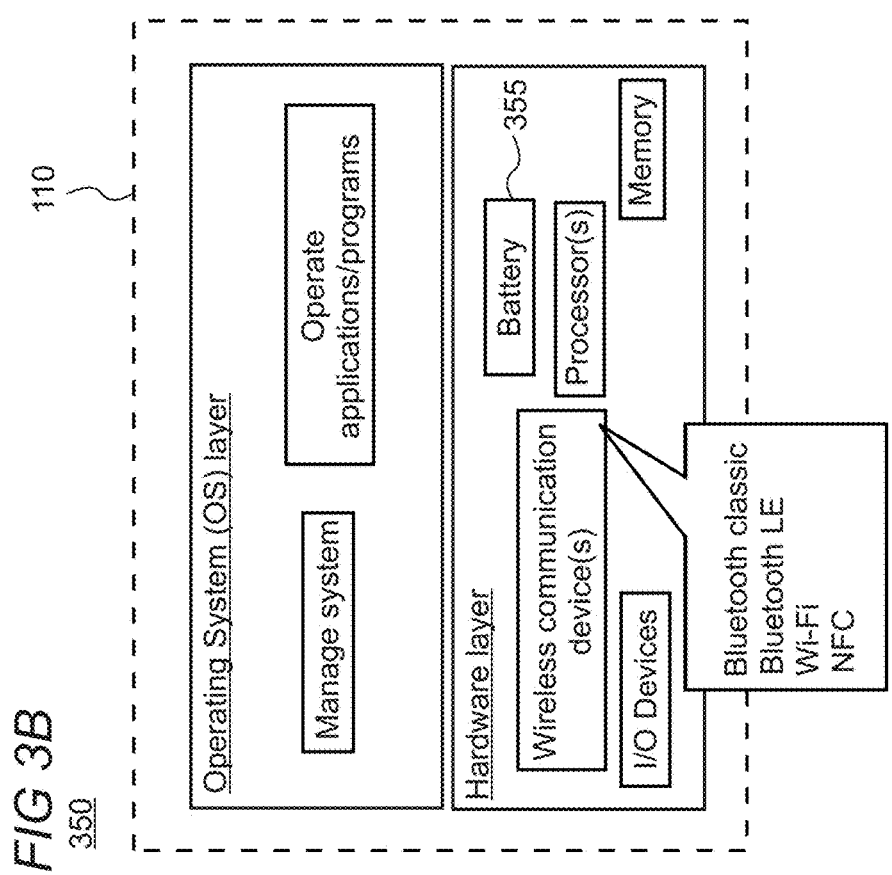
FIGS. 3A-B show illustrative schematics of peripheral computing devices.
Figure 3A:
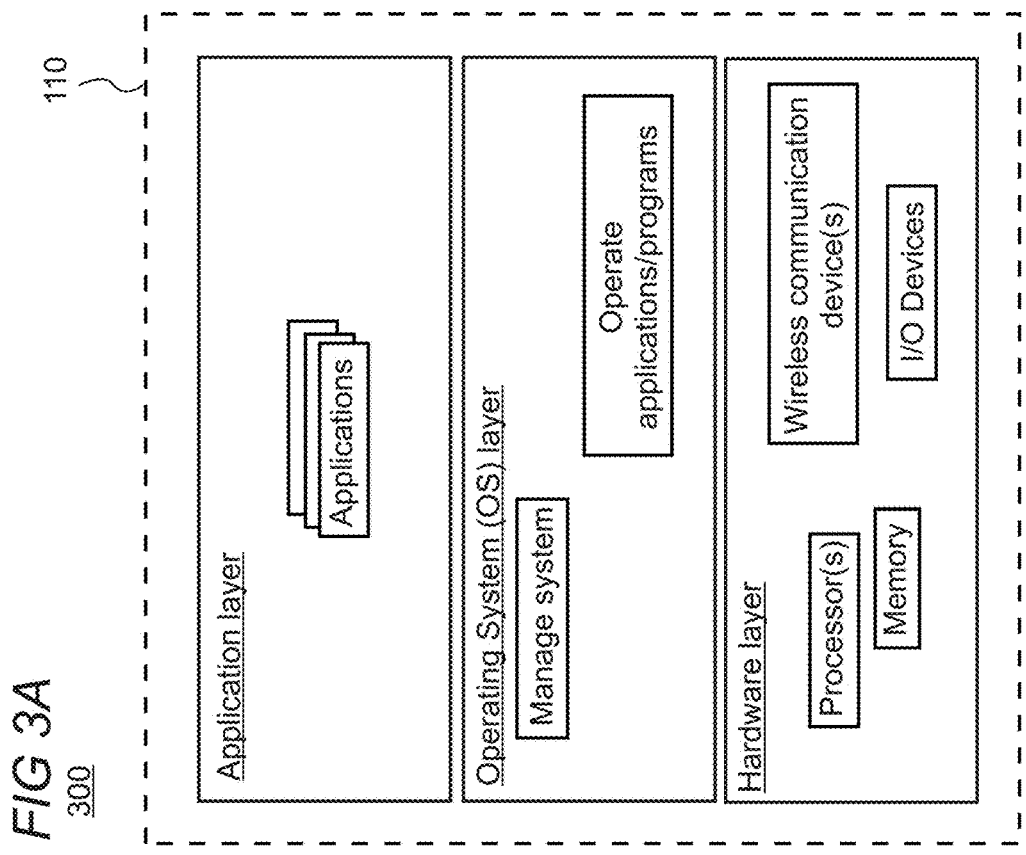

FIGS. 3A and B show illustrative layered architectures 300 and 350, respectively, of peripheral devices 110. Peripheral devices may be more complex devices as shown in FIG. 3A, with similar components as the host device as discussed above, or may be more candid and simplistic as depicted in FIG. 3B. The various layers and components within FIGS. 3A and B may operate similarly to the layers and components discussed above with respect to the host device of FIG. 2.

Turning to FIG. 3A, more complex devices can include, for example, a smartphone which operates as the peripheral (or slave) device when connected to a laptop computer (master device). As another example, a pair of headphones can include more complex features than typical headphones and thereby utilize various layers within the architecture depicted in FIG. 3A. For example, headphones with noise-cancelling capabilities and other complex functions may require additional components, applications, and the like.

On the other hand, the system depicted in FIG. 3B may be more compact for simplistic peripheral devices without the need for complex operations. For example, a keyboard may include a controller (or processor) dedicated for recognizing key strokes and transmitting the various key strokes and user inputs to the computer. In this scenario, the processor may communicate with the wireless communication device which transmits the various inputs to the host device.

If the keyboard is wireless, a battery 355 may provide the processor and other components with voltage to operate. Although the battery is only shown with respect to FIG. 3B, each system architecture depicted in FIGS. 2 and 3A may likewise include a battery or some direct power source. FIG. 3B also depicts exemplary non-exhaustive wireless communication technologies in which a peripheral device can be employed, including Bluetooth classic, Bluetooth LE, Wi-Fi, and NFC.

In order to establish a connection, such as using Bluetooth LE, a peripheral device 110 may beacon, or transmit, an advertisement packet. From here, the host device may detect the advertisement using the wireless communication device 235. If the wireless communication device recognizes the advertisement, then in some systems the wireless communication device delivers the signals to the OS for the host device for handling, in which the OS may forward the received data in the advertisement to one or more services or applications to perform various operations. In this scenario, multiple services may occupy system resources to perform identical tasks, such as monitor for the connection of the peripheral device. This may impact system resources by consuming battery and processing power and result in duplicative efforts across services.

FIGS. 4, 5, and 6 show illustrative environments 400, 500, and 600, respectively, in which each service registers a pattern to a proximity platform 415 to execute various functions, filters, and scenarios. A scenario or sub-scenario may represent a higher-level action to be performed by the host device, and filters or sub-filters may be more specific actions that are performed according to the given scenario. Filters and sub-filters can be used for more than one scenario and sub-scenario and are not necessarily unique to the particular scenario. Services 405, 505, and 605 each register (as indicated by reference numerals 420, 520, and 620) respective patterns 410, 510, and 610 with proximity platform 415. Depending on the given situation, both scenarios and filters can be indicated in the registered patterns.

The respective patterns can utilize pre-set patterns that are instantiated on the host device 105, such that each pattern represents particular information that is decipherable and comprehended by the host device. Thus, received advertisements from peripheral devices can correspond to registered patterns, thereby causing the host device to automatically comprehend details about the connected peripheral device and automatically perform functions for that particular peripheral device. The various services registering with the proximity platform centralize all processing in a single location (i.e. the proximity platform) within the OS and the utilized wireless communication device of the host device, instead of having multiple services monitor for particular peripheral device connections. Centralizing the processing at the proximity platform saves battery life, processing power, and bandwidth associated with the computing device, and can ultimately prolong the life of a single battery charge due to the savings in resources.

Figure 7:
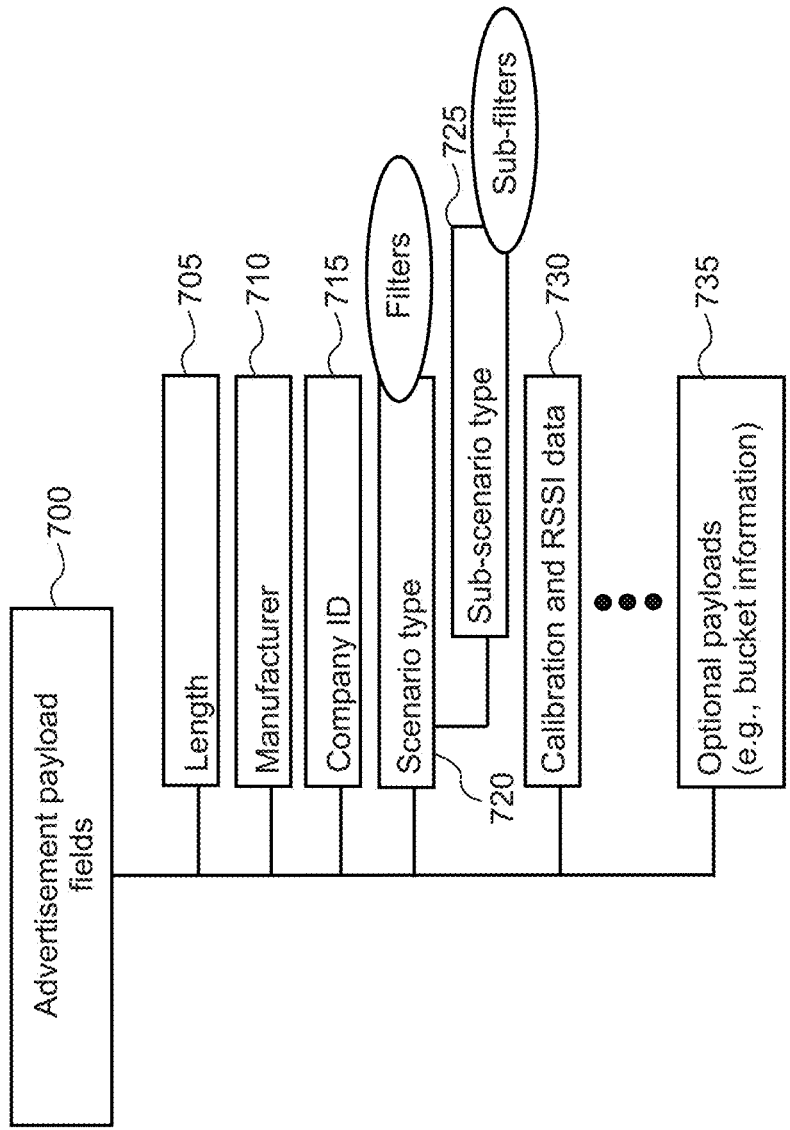
FIG. 7 shows an illustrative taxonomy of fields associated with an advertisement payload packet for a Bluetooth® transmission from a peripheral device.

FIG. 7 is an illustrative taxonomy of fields 700 associated with an advertisement payload transmitted from a peripheral device 110. The various fields can be filled with bytes or octets of information which form a complete pattern. The pattern, which is ultimately received by the host device, can provide particular details of information about the peripheral device, functions and operations which the host device performs, and filters which the host device applies, assuming both devices support the proximity platform protocols and underlying technology. The transmitted patterns may correspond to the registered patterns at the proximity platform from the respective services, as discussed with respect to FIGS. 4-6.

The taxonomy of fields 700 within the advertisement can include length 705, manufacturer 710, company ID 715, scenario type (e.g., using filters) 720, sub-scenario type 725 (e.g., using sub-filters), calibration and RSSI data 730, and optional payloads 735 (e.g., bucket information). Although filters and sub-filters are shown as examples with the scenarios, filters and sub-filters are just one example in which the host device implements a scenario. For example, a filter can be implemented with a sub-scenario, and a sub-filter can be implemented with a filter. The configuration of the scenarios and filters may ultimately be determined based on the desired functions for the host device when the peripheral device beacons or connects to the host device.

Additionally, each respective field can take up one or multiple fields within a payload depending on the overall configuration of the system with which the particular service registers its pattern and the host and peripheral device interact. For example, RSSI data 730 may use multiple fields to transmit data if the calibration techniques change or are found to be more or less efficient in a different manner.

Figure 8:
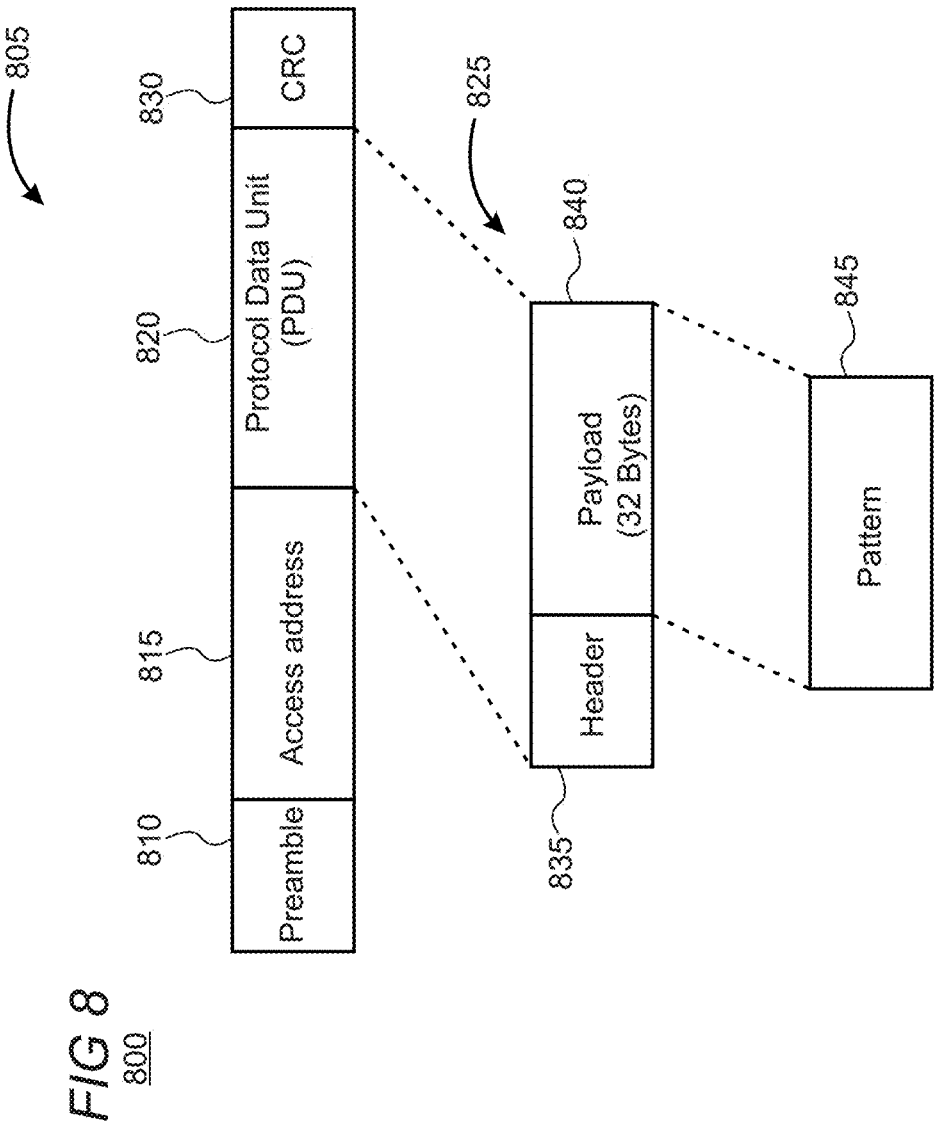
FIG. 8 shows an illustrative diagram of a data packet associated with a Bluetooth transmission.

FIG. 8 is an illustrative diagram 800 of a Bluetooth data packet 805 which peripheral devices 110 transmit to host devices 105. The data packet 805 includes various fields which serve different purposes and provides different information to the host device. The data within each respective field can be comprised of a prescribed number of one or more bytes (or octets), in which each peripheral device adheres to a particular structure following the Bluetooth protocol. Although examples using Bluetooth technology are used herein, other wireless communications and connections can implement the current proximity platform as well, including NFC or Wi-Fi.

A preamble 810 can be used for internal protocol management, such as synchronization and timing estimation at the receiving host device. An access address 815 can identify a connection between the host and peripheral devices to reduce the possibility of data packet collisions among different wireless connections. A PDU (Protocol Data Unit) 820 field carries a header 835 and payload 840 which contains the data for the advertisement packet data 825. A CRC (Cyclic Redundancy Check) 830 is an error-detecting code used to validate the packet for unwanted alterations, which can be used to ensure data integrity for wirelessly transmitted data packets.

The header 835 of the PDU field describes the packet type and the PDU type which can define the purpose of the peripheral device. For example, the PDU type can indicate the peripheral device is a connectable undirected advertising event, non-connectable undirected advertisement event, scannable undirected advertising event, etc. The payload 840 which also forms part of the PDU field 820 can be variably sized and describe a unique pattern 845 for the given scenario, such as the peripheral device and the actions which the host device will perform.

The payload includes a series of integers for sets of bytes that form patterns which indicate particular actions for the host device 105 to perform. For example, FIG. 9 depicts an illustrative structure of an advertisement data packet 825 which includes the header 835 and payload 840. The payload in this example contains 32 bytes, but based on the utilized Bluetooth version and the scenario, more or less bytes can also be utilized for the payload. The payload 840 includes fields 905 as representatively shown for Fields 1-N. FIG. 10 shows an illustrative advertisement data packet 825 in which the fields 1005 include integers, each one of which indicates to the host device information about the peripheral device, one or more actions to perform, or one or more filters to apply.

Figure 11:
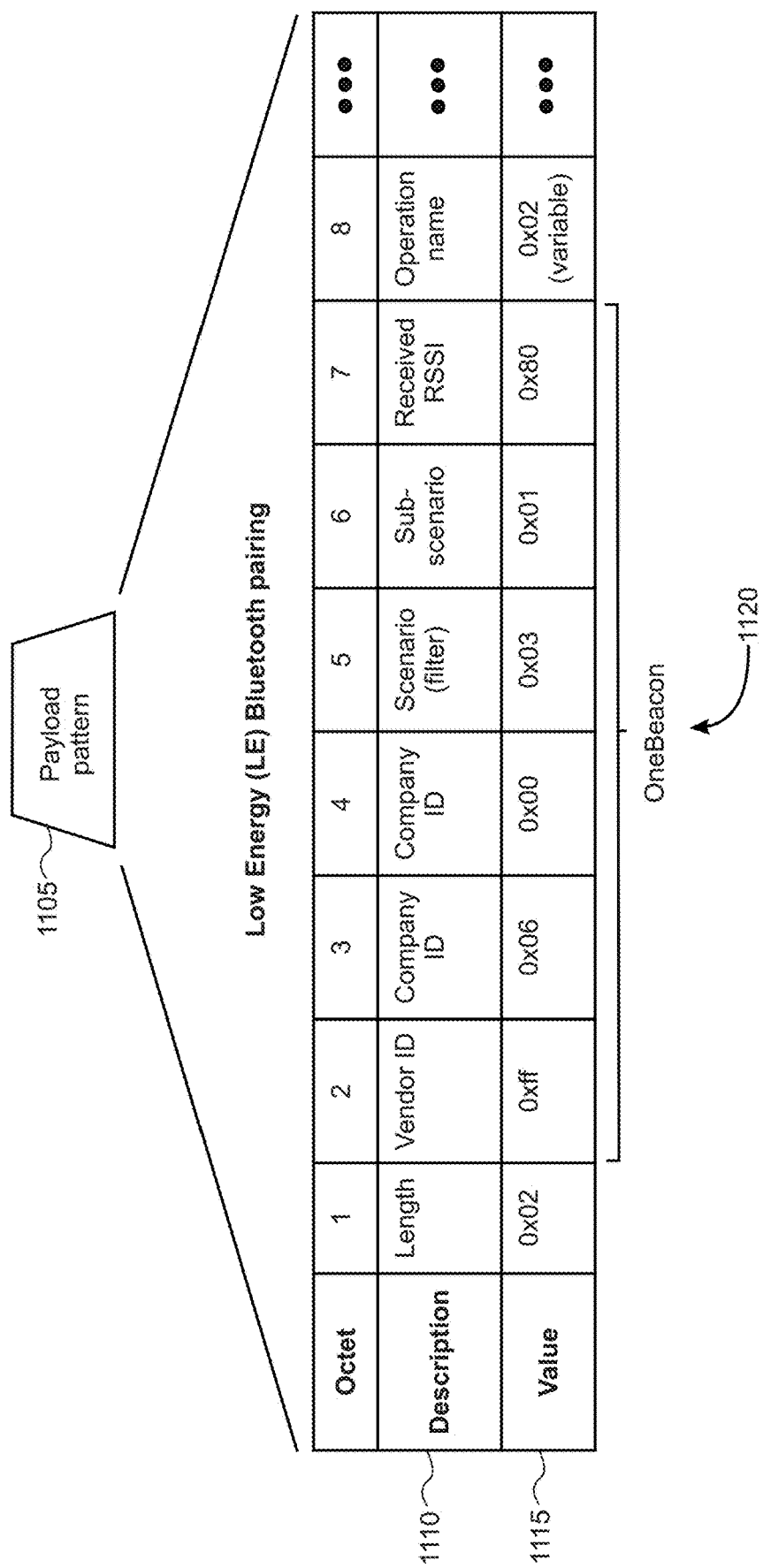
FIG. 11 shows an illustrative advertisement's payload pattern associated with LE (Low Energy) Bluetooth pairing.
Figure 12:
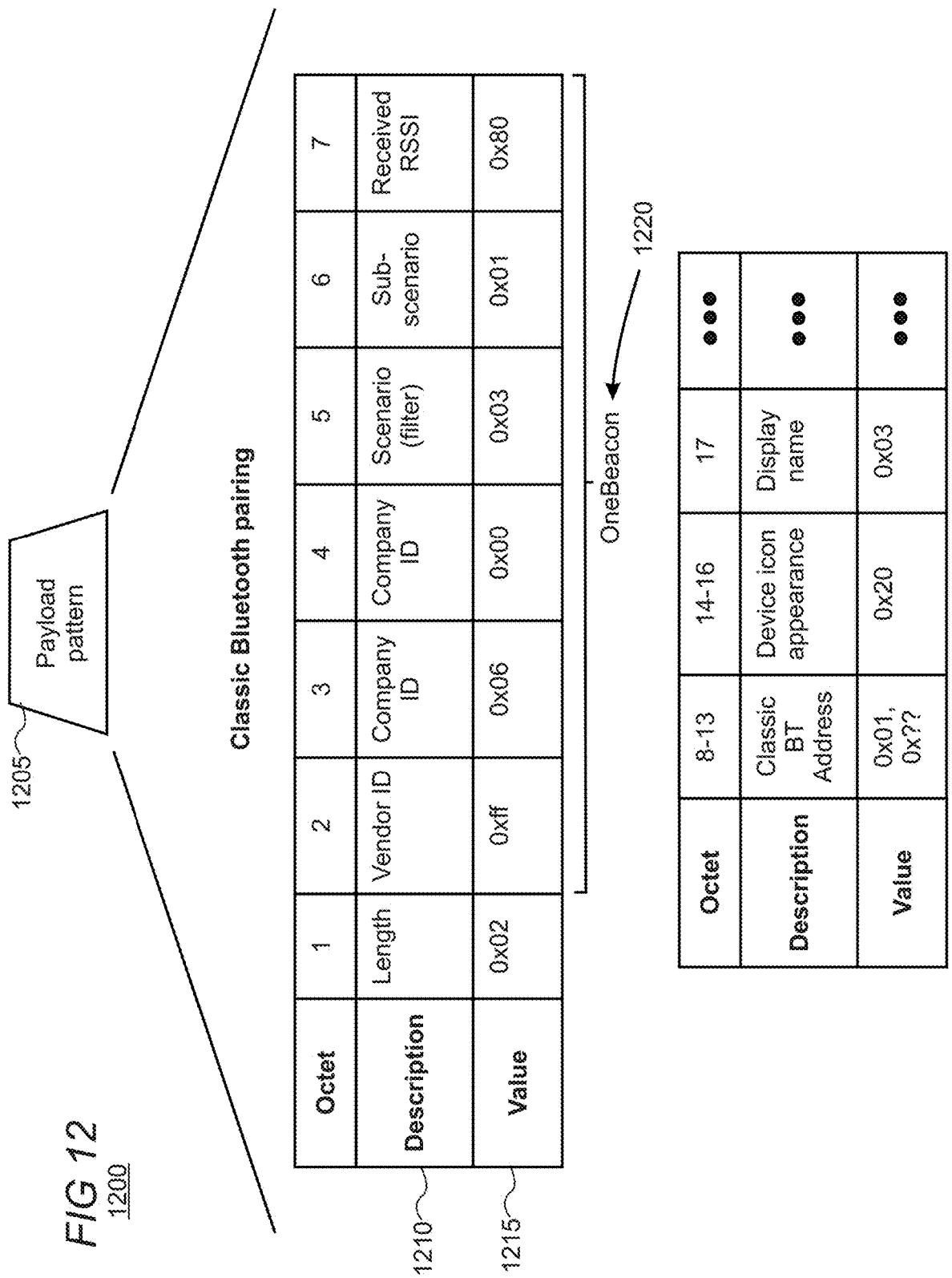
FIG. 12 shows an illustrative advertisement's payload pattern associated with classic Bluetooth pairing.

FIGS. 11 and 12 show illustrative advertisement packets 1100 and 1200, respectively, with unique patterns 1105 and 1205, in which advertisement 1100 may be configured for LE (Low Energy) Bluetooth pairing, and advertisement packet 1200 may be configured for classic Bluetooth pairing, such as using EDR (Enhanced Data Rate). As depicted in FIGS. 11 and 12, the payload of the advertisement packet can include multiple fields, each of which corresponds to a particular respective description 1110 and 1210 and value 1115 and 1215.

Each value associated with the respective field provides specific information as detailed in the description fields 1110 and 1210 (e.g., length, vendor ID, company ID, scenario, received RSSI calibration, etc.) Other information not depicted can also be included in the advertisement, such as MAC (Media Access Control) address for the peripheral device. Although particular octets are illustrated in FIGS. 11 and 12, other variations are also possible. For example, certain fields may be removed and additional octets can be given to, for example, the scenario field. So long as bytes are still available, additional fields can be created or given to a particular description or other purpose. For non-connected peripheral devices (broadcasting advertisement or beacons), the advertisement fields can be used as patterns. For connected peripheral devices, additional information can be retrieved using Bluetooth GATT (Generic Attributes) database or L2CAP (Logical Link Control and Adaptation Protocol) service connections to customize the proximity scenario.

OneBeacon (represented by reference numerals 1120 and 1220), may indicate a particular scenario between the host and peripheral devices. The OneBeacon protocol is the payload format structure used which provides an entry or first level indication to the host device for the scenarios and sub-scenarios that are used. Thus, the proximity platform implements a OneBeacon scenario, which indicates to devices to implement particular scenarios and sub-scenarios, which from there can result in the host device executing particular filters and sub-filters. In the examples contained in FIGS. 11 and 12, OneBeacon is indicated through fields 2-7, but OneBeacon can alternatively be indicated using less fields (e.g., one or two fields), or more fields. Although in the present situation OneBeacon is used, the proximity platform can ultimately operate without the indications of the OneBeacon format. Furthermore, OneBeacon is but one example of an entry level implementation of the scenario and sub-scenario endeavors, but other customizations of the fields (e.g., vendor and company ID fields) can result in a different scenario separate from OneBeacon.

When the host device identifies fields that indicate the OneBeacon scenario, this may indicate a particular payload format to implement a particular scenario as indicated in one of the payload's fields. If the peripheral device detects that the host device does not support (e.g., is not configured to, does not participate in) the OneBeacon protocol with the executable filters and sub-scenarios, the peripheral device may still pair normally without utilizing the filters and scenarios. Thus, the OneBeacon indicates to the host and peripheral devices that each device is configured with fields for the proximity platform, or to otherwise utilize the original pairing mode without scenarios, sub-scenarios, and filters.

Figure 13:
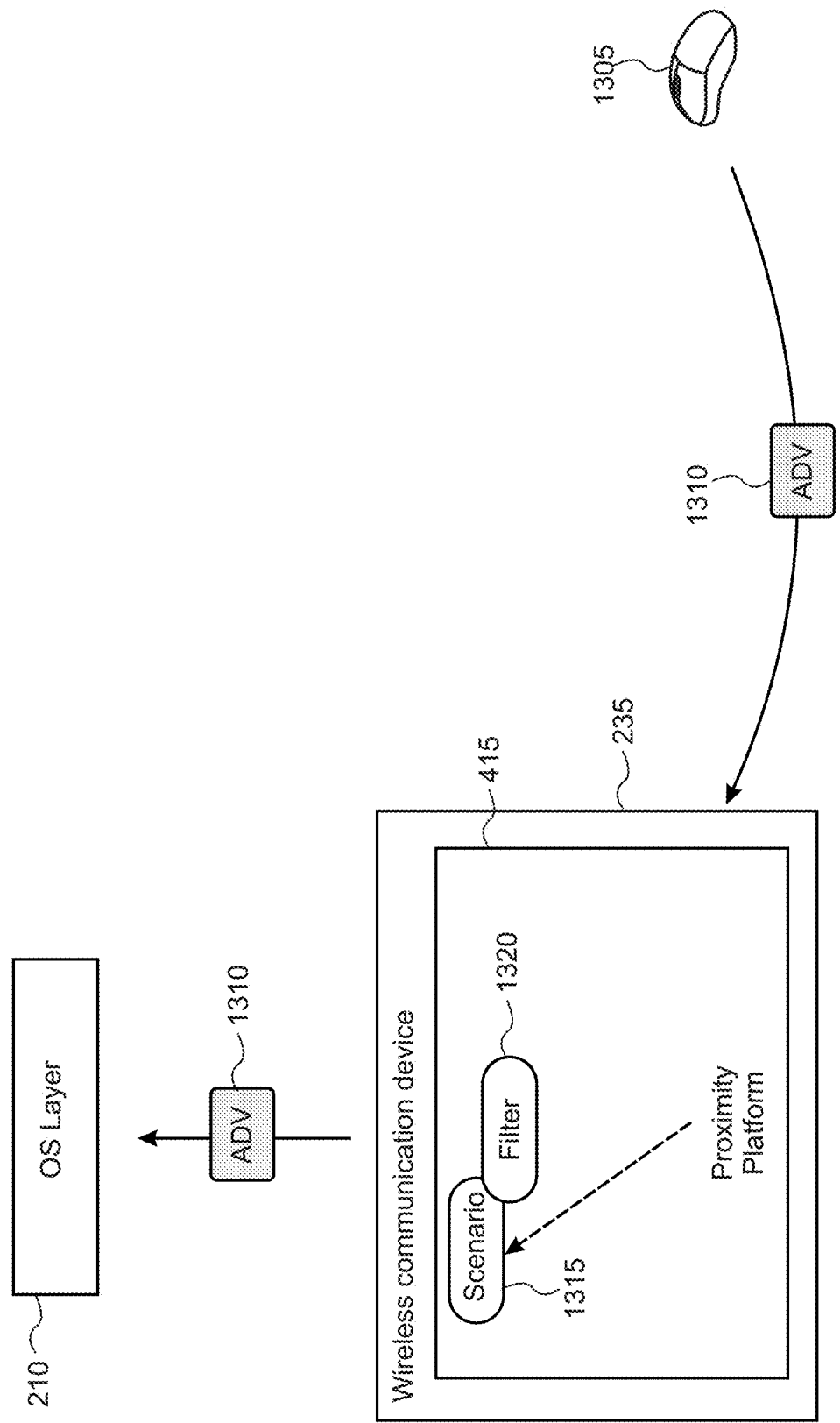
FIG. 13 shows an illustrative operation by a host device upon receiving an advertisement packet from a mouse-peripheral device.
Figure 14:
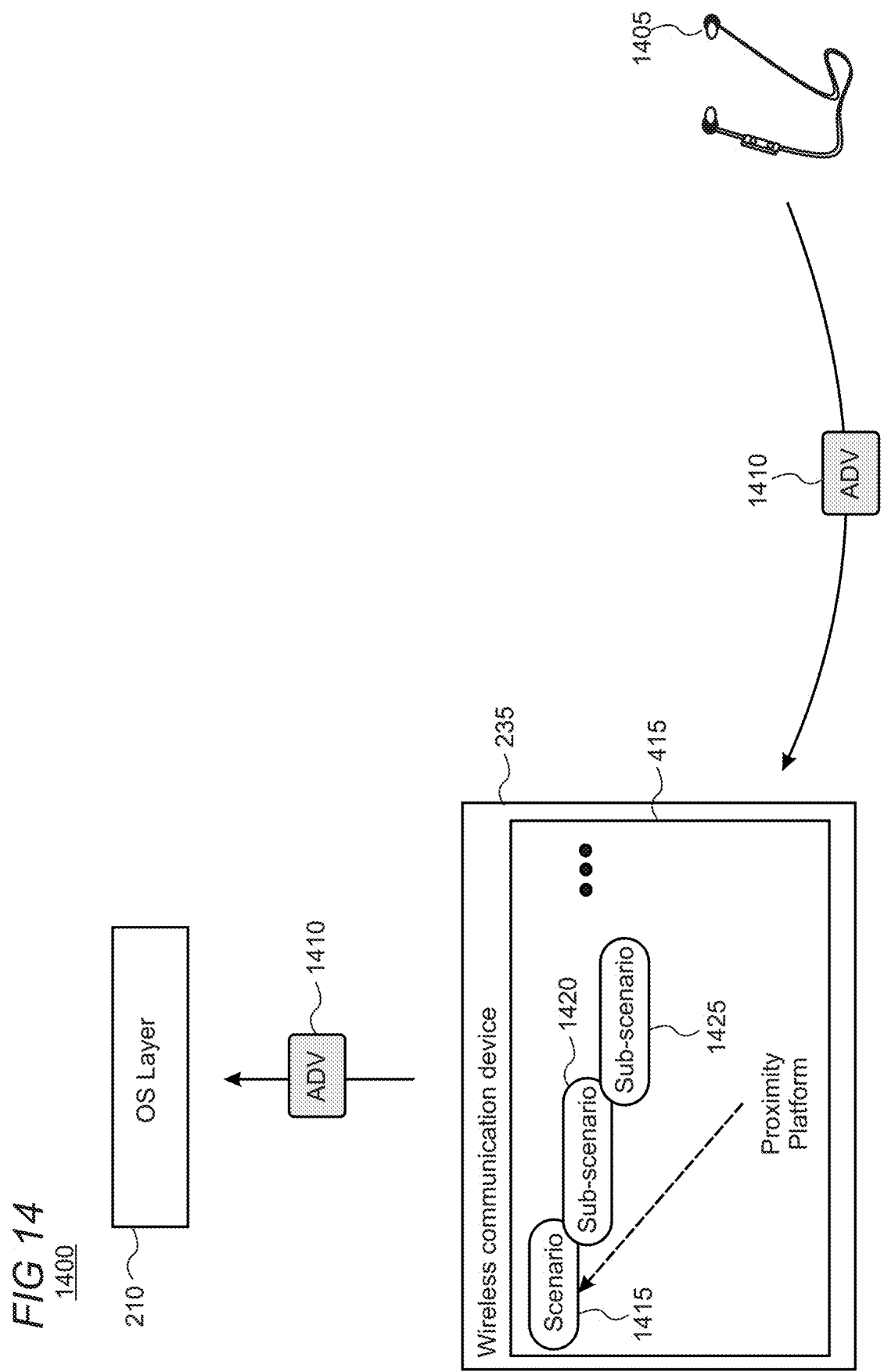
FIG. 14 shows an illustrative operation by a host device upon receiving an advertisement packet from a headphones-peripheral device.

FIGS. 13 and 14 show illustrative respective environments 1300 and 1400 in which the proximity platform for the host device handles scenarios and filters depending on the services and applications registered in the OS. For example, in FIG. 13, a mouse 1305 (the peripheral device in this example) transmits an advertisement 1310 according to the OneBeacon protocol to the wireless communication device 235 associated with the host device 105. The particular scenarios and filters applied depend on and correspond to the pattern from the advertisement (FIGS. 11 and 12).

In this example, the proximity platform 415 of the wireless communication device recognizes the advertisement as a communication that the OS can utilize, such as by detecting scenario 1315 and an applied filter 1320. From here, the wireless communication device forwards the advertisement to the OS for handling. In this regard, the proximity platform client can serve as a client instantiated on the wireless communication device and the OS. Without the proximity platform, the OS layer may typically forward the recognized advertisements to particular services or applications on the host device for handling. In contrast, the proximity platform is a centralized platform to carry out the various tasks.

FIG. 14 provides another exemplary environment 1400 in which a pair of headphones 1405 (the peripheral device in this example) transmits an advertisement 1410 to the wireless communication device 235 associated with the host device 105. In this example, the proximity platform detects a single scenario 1415, and sees there are associated sub-scenarios 1420 and 1425 for the host device to perform for this particular peripheral device, that is, the headphones.

The differing functions between the examples in FIGS. 13 and 14 may be attributed to different patterns within the advertisement packet payloads. For example, in FIG. 13 the host device may wish to surface a notification on the UI to quickly enable the user to connect the mouse. In contrast, in FIG. 14 the host device may wish to initiate a music application, automatically play music, and execute other scenarios and associated filters that may be utilized and convenient for the user upon connecting the headphones.

Figure 15:
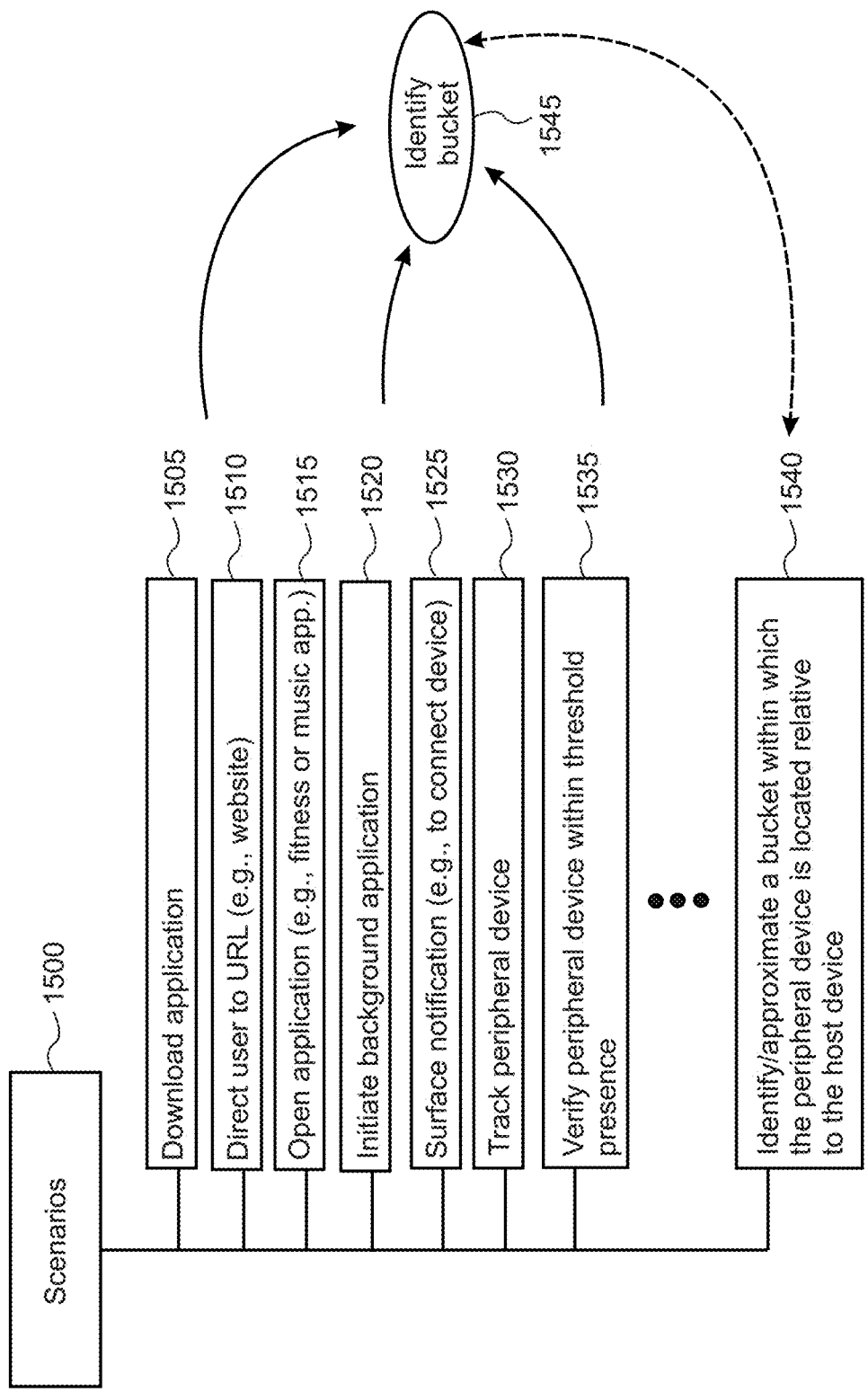
FIG. 15 shows an illustrative taxonomy of scenarios in which a host device can perform.

FIG. 15 shows an illustrative taxonomy of scenarios 1500 which the host device can perform upon connecting with a peripheral device. Although particular scenarios in the form of actions and functions are depicted in FIG. 15, the list is non-exhaustive and other filters and scenarios may also be performed. Exemplary scenarios performable by the host device include download applications 1505, direct user to URL (e.g., website, local/remote folder) 1510, open one or more applications (e.g., fitness or music app.) 1515, initiate one or more background applications 1520, surface notification (e.g., to connect device) 1525, track peripheral device (e.g., its location relative to the host device) 1530, verify peripheral device is within a threshold presence to the host device 1535, and identify or approximate a bucket within which the peripheral device is located 1540 (FIGS. 20-22). In this example, identifying buckets 1545 (which corresponds to the functions represented by numeral 1540), may be performed for multiple different scenarios since the host device may often times find useful an approximate scenario-driven proximity or categorical representation of distance for the peripheral device.

The threshold presence can be satisfied, for example, when the peripheral device is within range to and detectable by the host device. For example, the threshold presence may be a maximum distance between the peripheral device and the host device even if the device is not fully operational at such maximum distance (e.g., there is delay or connectivity issues). Alternatively, the threshold presence may be satisfied when the peripheral device is within operational distance to the host device, where such operational distance is a maximum distance over which the host and peripheral devices may interact while still operating properly and with no or minimal connectivity issues, lag, interruptions, etc.

Figure 16:
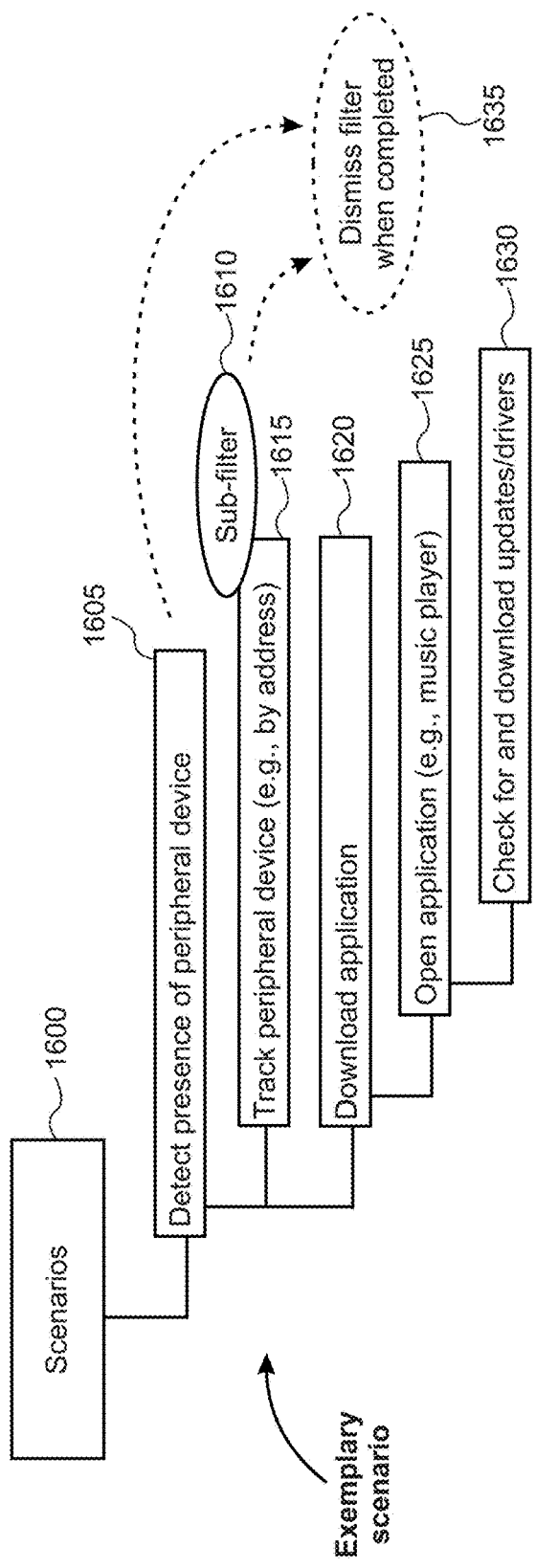
FIG. 16 shows an illustrative taxonomy of scenarios, filters, and sub-filters in which a host device can perform.

FIG. 16 shows an illustrative taxonomy of scenarios 1600 for a scenario in which sub-scenarios are also present, that is, indicated within the payload pattern. A particular pattern triggers or causes the host device to detect a presence of the peripheral device 1605. For example, the presence may be a threshold presence in which the advertisement beacon is retrievable by the host device's wireless communication device (e.g., a maximum distance to recognize the device). In this scenario, a sub-filter 1610 may be used to track the peripheral device 1615. Tracking may include verifying a distance for the peripheral device so that the host device can continue using or relying on the peripheral device without fear that the peripheral device is out of range, no longer active, no longer switched on, and the like. Alternatively, tracking may include associating the peripheral device with a particular categorical representation of the peripheral device's position relative to the host device. In order to track the peripheral device by address, the payload is no longer necessary to match, and therefore just the address can be used.

After the host device detects the presence of the peripheral device (e.g., receives the broadcast beacon advertisement), that filter may be dismissed (as represented by numeral 1635) or may be maintained. For example, the presence detection filter may be mainly used to detect the presence of a peripheral device in conjunction with the given scenario. The scenario then determines what the next step is, which in this case is a second tracking filter by address 1615. This second filter can be dismissed when the scenario is completed. In this situation, the first filter remains in order to detect any other device for this particular scenario, so that other peripheral devices can also utilize this scenario functionality.

In alternative embodiments, however, the first filter may also be dismissed along with the second filter, or the second filter can be maintained. For example, the host device may track the presence of the peripheral device, in which case the host device may periodically identify or approximate locations for the peripheral device. If the peripheral device is no longer active, then the process may repeat in which the first filter to detect the peripheral device's presence 1605 may be applied until it has been satisfied.

As shown in FIG. 16, additional scenarios and filters can also be employed. For example, the host device can download an application 1620, open an application (e.g., music player) 1625, and check for and download updates/drivers 1630. As discussed above, any one or more of these filters can also be dismissed after completion, or can be maintained.

Figure 17:
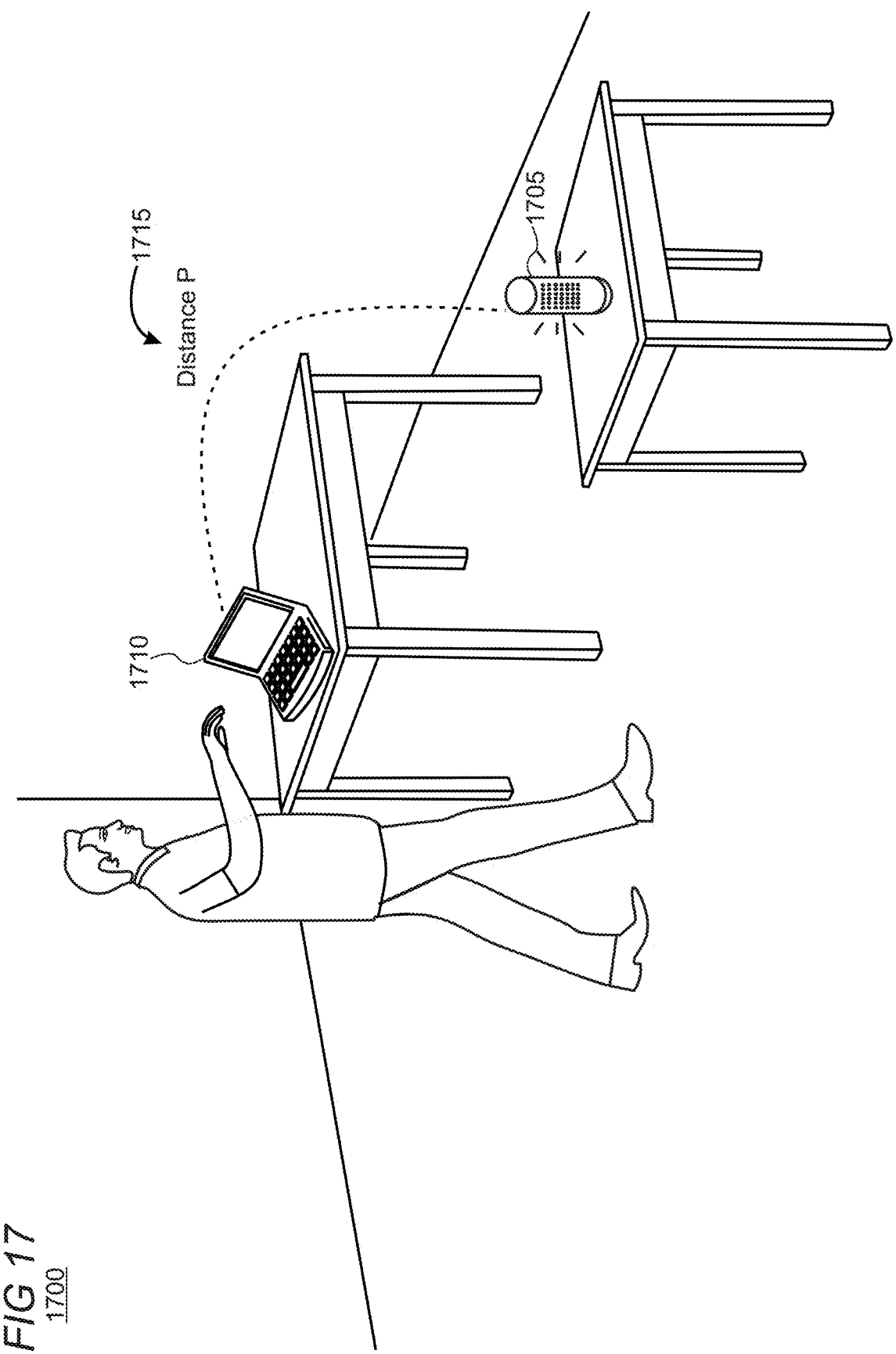
FIG. 17 shows an illustrative environment in which a user connects a Bluetooth wireless speaker to a laptop computer.

FIG. 17 provides an exemplary scenario 1700 in which a wireless speaker 1705 (peripheral device) connects to (or attempts to connect by beaconing) a laptop 1710 (host device), and the laptop determines a location for the speaker relative to the laptop. As shown in FIG. 17, a distance P (represented by reference numeral 1715) extends between the laptop and the speaker. The host device is configured to determine proximity-based buckets using values transmitted from the speaker in the advertisement packet and local configuration parameters on the host device, since a laptop may have different calibration than a desktop workstation.

Figure 18:
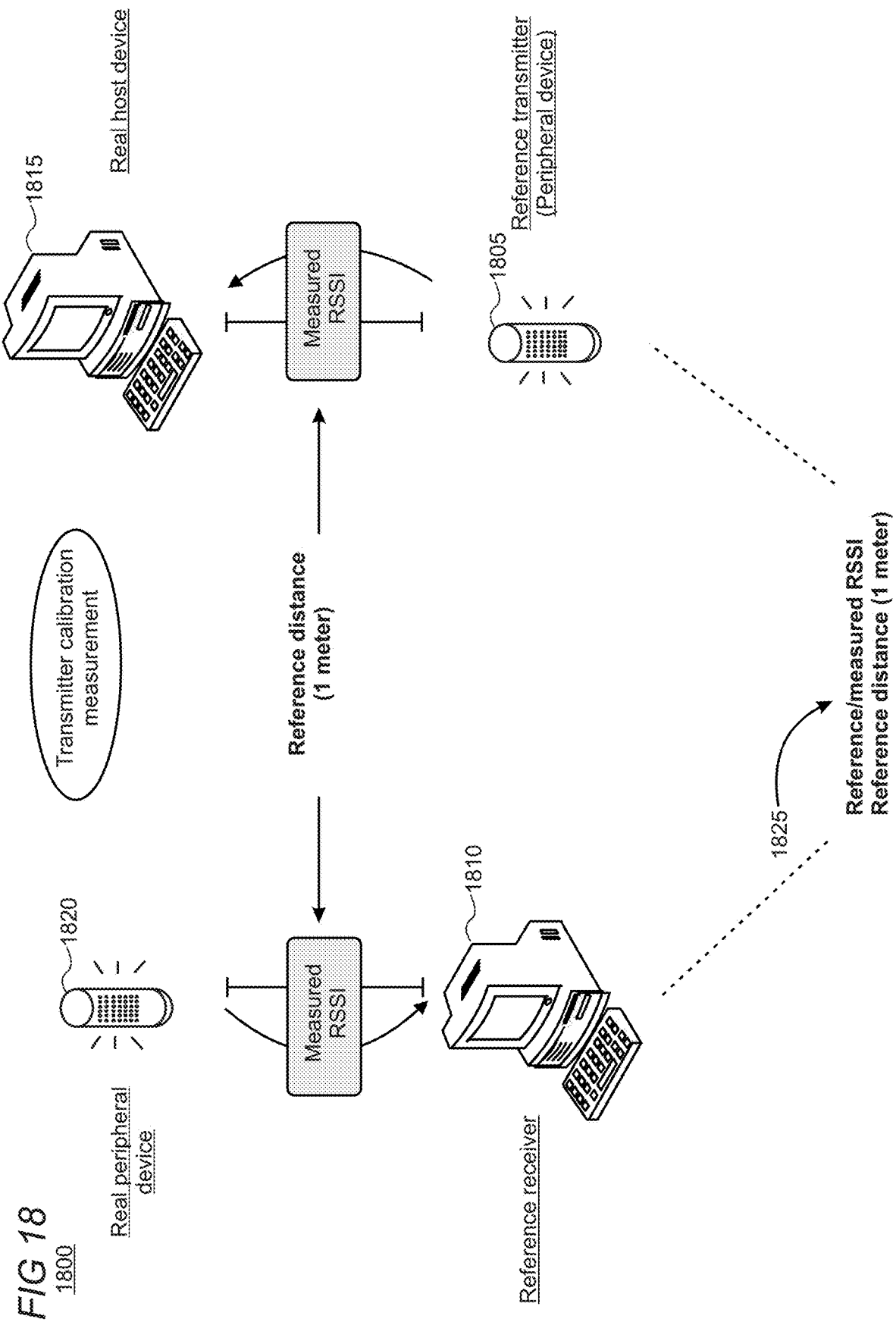
FIG. 18 shows an illustrative environment in which reference transmitters and reference receivers are utilized with real transmitters and real receivers to calibrate a measurement for the Bluetooth wireless speaker.

FIG. 18 shows an illustrative environment 1800 in which previous testing is performed on a reference transmitter (a speaker in this example) 1805 and a reference receiver (a PC in this example) 1810 to calibrate a particular peripheral device. For example, in order to calibrate the devices, the reference transmitter is calibrated against a real host device 1815 and a reference receiver 1810 is calibrated against a real peripheral device 1820. Based on the calibration, referential data 1825 is determined for that particular peripheral device. For example, the referential data 1825 can be data which represents values in particular scenarios, which can be compared with real-time, or live, values between a host and peripheral device, such as the wireless speaker 1705 and laptop 1710 in FIG. 17.

The referential data 1825 can include a measured RSSI value and the reference distance from which the measured RSSI value was derived. The scenario depicted in FIG. 18 can be an ideal situation in which little to no interference is present, antennae are operating properly and in proper orientation, the distance is ideal for the particular device and/or wireless communication device (i.e., transceiver), and any other factors which can affect signal reception quality for the broadcasted advertisement/beacon.

The referential data can then be used in the real-time example to determine a scenario driven proximity. FIG. 19 illustrates a schematic representation 1900 of the scenario in FIG. 17. As illustrated in FIG. 19, the speaker 1705 transmits an advertisement packet 1905 to the laptop 1710, from which the laptop determines a scenario-driven proximity (represented by reference numeral 1930). The scenario-driven proximity can be used instead of an actual distance as represented by 1715 in FIG. 17. The advertisement packet 1905 includes calibration and live data in the payload which the laptop uses to determine the scenario-driven proximity. For example, the payload can include reference RSSI (FIG. 18) and reference distance (FIG. 18), all of which can be used by the host device to determine or approximate the distance P.

As an additional example and enhancement of the system, the calibrated RSSI value and other information obtained during the calibration phase can be pre-stored by the host device and the peripheral device and be referenced when the peripheral device transmits the advertisement. This may allow a first or third party to periodically update calibration information to the host device. The host device may further be configured to take into account additional factors which can influence RSSI values and thereby adjust the accuracy of the determined distance, such as attenuation scaling 1915, fade margin 1920, and other factors which can cause interference 1925 for the wireless connection and thereby affect the transmitted live RSSI value.

The following section includes explanatory discussion and formulas which the host device can utilize to determine or approximate the distance of a peripheral device relative to the host device. Using the path loss equation and the Friis transmission equation, the distance formula can be modeled as:

$$R_x = k_c k_t k_r \frac{T_x}{(md)^n}$$

$$\log R_x = \log k_c + \log k_t + \log k_r + \log T_x - n \log d - n \log m$$

$$\log d = \frac{\log k_c + \log k_t + \log k_r + \log T_x - \log R_x - n \log m}{n} =$$
$$\frac{1}{n}(\log T_x - \log R_x) + \frac{(\log k_c + \log k_t + \log k_r)}{n} - \log m$$

Where:
$T_x$=Effective transmit power;
$R_x$=Received power (RSSI);
$k_c, k_t, k_r$=Attenuation scaling, fade margin, etc. These are respectively for transmission channel, transmitter radio, and the receiver radio;
d=Distance;
n=Channel-dependent exponent (Typically>2, 2 in free space); and
m=Correctional coefficient, the constant can be affected by factors such as transmission frequency.

By making successive measurement at different distance with a fixed $T_x$, the coefficients $k_t$, $k_r$ and n can be estimated empirically for a given channel condition:
Direct line of sight,
At an angle most likely to be relevant to radio (sideways or in front of host device for example),
For example, for n given a set of measurements:

$(R_{x1}, T_{x1}, d_1), (R_{x2}, T_{x2}, d_2)$: $\log R_{x1} = \log k + \log T_{x1} - n \log d_1 - n \log m$ $\log R_{x2} = \log k + \log T_{x2} - n \log d_2 - n \log m$ $\log R_{x2} - \log R_{x1} = \log T_{x2} - \log T_{x1} - n(\log d_2 - \log d_1)$ $$n = \frac{(\log T_{x2} - \log T_{x1}) - (\log R_{x2} - \log R_{x1})}{(\log d_2 - \log d_1)}$$

Assuming the effective transmit power is unknown when making the measurement for a black box device, the transmit power may remain constant for the calibration to work. The channel exponent n can be empirically determined:

$$n = \frac{-(\log R_{x2} - \log R_{x1})}{(\log d_2 - \log d_1)}$$

The distance can be estimated via relative comparison with a baseline measurement at a known distance:

$$\log R_{x0} = \log k_{t1} + \log k_{r0} + \log k_{ct0} + \log T_{x1} - n_{t0}\log d_0 - n_{t0}\log m_{t0}$$

$$\log R_x = \log k_{t1} + \log k_r + \log k_{ct} + \log T_{x1} - n\log d - n\log m$$

$$\log R_x - \log R_{x0} = (\log k_r - \log k_{r0}) +$$
$$(\log k_{ct} - \log k_{ct0}) - n\log d - n\log m + n_{t0}\log d_0 + n_{t0}\log m_{t0}$$

$$n\log d - n_{t0}\log d_0 = (\log k_r - \log k_{r0}) + (\log k_{ct} - \log k_{ct0}) -$$
$$(\log R_x - \log R_{x0}) - (n\log m - n_{t0}\log m_{t0})$$

$$\log d = \frac{n_{t0}}{n}\log d_0 - \frac{1}{n}(\log R_x - \log R_{x0}) + \frac{1}{n}(\log k_r - \log k_{r0}) +$$
$$\frac{1}{n}(\log k_{ct} - \log k_{ct0}) - \frac{1}{n}(n\log m - n_{t0}\log m_{t0})$$

$$\log d = \frac{n_{t0}}{n}\log d_0 - \frac{1}{n}(\log R_x - \log R_{x0}) + \frac{1}{n}(\log k_r - \log k_{r0}) + A$$

Where:
$T_{x1}$=Effective transmit power of transmitter under calibration;
$R_{x0}$=Received power (RSSI) at fixed reference distance $d_0$ from transmitter calibration measurement;
$R_x$=Received power (RSSI) in real time measurement;
$d_0$=Reference measurement distance (usually 1 meter for simplicity);
$k_{t1}$=Attenuation scaling for the transmitter under calibration;
$k_{r0}$=Attenuation scaling, fade margin for reference receiver; and
$n_{t0}$, $m_{t0}$=Channel-dependent and correctional coefficient for reference measurement setup for transmitter under calibration.

$$A = \frac{1}{n}(\log k_{ct} - \log k_{ct0}) - \log m + \frac{n_{t0}}{n}\log m_{t0}$$

If the following assumptions are made:
$k_c$, n are constant between the calibration (same channel condition);
the correctional coefficient m is constant;

$$\log d = \log d_0 - \frac{1}{n}(\log R_x - \log R_{x0}) + \frac{1}{n}(\log k_r - \log k_{r0})$$

The remaining tail coefficient A is reduced to zero in the ideal case. Experimental measurements can be made to estimate what the variance of A is to determine the confidence level of the distance estimate.

If the reference distance is one meter and the same reference receiver is used, the formula is simplified to:

$$\log d = \frac{1}{n}(\log R_{x0} - \log R_x)$$

However, the receiver may also be calibrated using relative measurements to determine the values of $k_r$.

$$\log R_{xr} = \log k_{r0} + \log k_{r0} + \log k_{c0} + \log T_{x0} - n_{r0}\log d_0 - n_{r0}\log m_{r0}$$

$$\log R'_x = \log k_{r0} + \log k_r + \log k'_c + \log T_{x0} - n'\log d_0 - n'\log m' + n_{r0}\log m_{r0}$$

$$\log m'\log R'_x - \log R_{xr} = (\log k_r - \log k_{r0}) + (\log k'_c - \log k_{c0}) - \log d_0(n' - n_{r0}) - n'\log m' + n_{r0}\log m_{r0}$$

$$\log k_r = \log k_{r0} + (\log R'_x - \log R_{xr}) - (\log k'_c - \log k_{c0}) + \log d_0(n' - n_{r0}) - n'\log n' - n_{r0}\log m_{r0}$$

At reference distance of 1 meter, this becomes:

$$\log k_r =$$
$$\log k_{r0} + (\log R'_x - \log R_{xr}) - (\log k'_c - \log k_{c0}) + n'\left(\log m' - \frac{n_{r0}}{n'}\log m_{r0}\right)$$

$$\log k_r = \log k_{r0} + (\log R'_x - \log R_{xr}) + B$$

Where:
$T_{x0}$=Effective transmit power of reference transmitter;
$R_{xr}$=Received power (RSSI) at fixed reference distance $d_0$ between reference transmitter and reference receiver;
$R'_x$=Received power (RSSI) at fixed reference distance $d_0$ between reference transmitter and receiver under calibration;
$k_{t0}$=Attenuation scaling for the reference transmitter;
$k_{r0}$=Attenuation scaling, fade margin for reference receiver; and
$n_{r0}$, $m_{r0}$=Channel-dependent and correctional coefficient for measurement setup between reference transmitter and reference receiver.

$$B = n'\left(\log m' - \frac{n_{r0}}{n'}\log m_{r0}\right) - (\log k'_c - \log k_{c0})$$

If the following assumptions are made:
$k_c$, n are constant between the calibration (same channel condition);
the correctional coefficient m is constant;
$d_0$ is 1 meter;
$\log k_r = \log k_{r0} + (\log R'_x - \log R_{xr})$;
The remaining tail coefficient B is reduced to zero in the ideal case.
Experimental measurements can be made to estimate what the variance of B is to determine the confidence level of the receiver calibration estimate.

The distance can now be estimated via the full formula:

$$\log d =$$
$$-\frac{1}{n}(\log R_x - \log R_{x0}) + \frac{1}{n}(\log k_{r0} + (\log R'_x - \log R_{xr}) + B - \log k_{r0}) + A$$

$$\log d = -\frac{1}{n}(\log R_x - \log R_{x0}) + \frac{1}{n}((\log R'_x - \log R_{xr}) + B) + A$$

$$\log d = -\frac{1}{n}(\log R_x - \log R_{x0}) + \frac{1}{n}(\log R'_x - \log R_{xr}) + \frac{B}{n} + A$$

$$C = \frac{B}{n} + A = \frac{n'}{n}\left(\log m' - \frac{n_{r0}}{n'}\log m_{r0}\right) -$$
$$\frac{1}{n}(\log k'_c - \log k_{c0}) + \frac{1}{n}(\log k_{ct} - \log k_{ct0}) - \log m + \frac{n_{t0}}{n}\log m_{t0}$$

$$C = \frac{n'}{n}\log m' - \frac{n_{r0}}{n}\log m_{r0} + \frac{1}{n}((\log k_{ct} - \log k_{ct0}) - (\log k'_c - \log k_{c0})) -$$
$$\log m + \frac{n_{t0}}{n}\log m_{t0}$$

$$C = \frac{n_{t0}}{n}\log m_{t0} - \frac{n_{r0}}{n}\log m_{r0} + \left(\frac{n'}{n}\log m' - \log m\right) +$$

$$\log d = -\frac{1}{n}(\log R_x - \log R_{x0} - \log R'_x + \log R_{xr}) + C$$
$$\frac{1}{n}((\log k_{ct} - \log k_{ct0}) - (\log k'_c - \log k_{c0}))$$

Where:

$R_x$=Received power (RSSI) measured in real time;

$R_{x0}$=Received power (RSSI) at fixed reference distance 1 meter obtained from transmitter calibration measurement;

$R'_x$=Received power (RSSI) at fixed reference distance 1 meter between reference transmitter and receiver obtained during receiver calibration measurement;

$R_{xr}$=Received power (RSSI) at fixed reference distance 1 meter between reference transmitter and reference receiver;

n=empirically determined exponent via a two points measurement:

$$n = \frac{-(\log R_{x2} - \log R_{x1})}{(\log d_2 - \log d_1)}$$

When scenario-driven proximity or location for the peripheral device is determined (e.g., a categorical representation of distance relative to the host device), the host device can use this information as an additional tool in which scenarios or filters can be implemented. For example, one such scenario the host device can implement is to track the peripheral device after a connection is established (e.g., Bluetooth EDR or LE.) To accurately track the peripheral device, the host device can utilize the calibration technique to determine a scenario-driven proximity for the peripheral device based on the various data received, as illustrated in the payload of the advertisement packet 1905 of FIG. 19.

FIGS. 20 and 21 depict environments 2000 and 2100, respectively, where buckets are utilized, in which the buckets define specific distal parameters where the peripheral device 110 can be located relative to the host device 105. Thus, every distal point from the host device can be associated with a particular bucket. The buckets can be utilized as an alternative to or as a complement to the calibration technique discussed above. For example, the proximity platform can implement filters/scenarios based on determined distances for the peripheral device and/or based on the bucket in which the peripheral device is determined to be located. When a particular bucket is determined as the bucket where the peripheral device is located, this can be based on calibrated determinations as discussed above, or simply based on the raw RSSI data associated with the peripheral device in a live connection.

FIG. 20 shows various buckets 2005 defined by particular distances represented by X, Y, and Z decibels (–dBm) using the RSSI values. Any distance beyond Z –dBm can signify that the peripheral device is out of range 2010 from the host device. The host device may be configured to execute a particular filter or scenario based on the bucket in which a given peripheral device is located.

Thus, for example, the distance line 2015 indicates various locations which the host device can identify for a peripheral device. Each time the host device determines that the peripheral device is located within a new bucket, the host device may perform a particular function, such as surface a notification to the user when the peripheral device has been identified as being "present" and is nearing "out of range." The payload pattern transmitted from the peripheral device may decide whether or not the host device performs a function and which function is performed when the peripheral device enters a particular bucket.

The buckets can be pre-determined parameters that are associated with a particular scenario for the peripheral device (e.g., mouse, keyboard, and speaker). Although the RSSI values and buckets can be used to indicate an estimated distance, they can alternatively indicate a distal category that represents a strength or lack of strength of the beaconing. In addition, parameters for a bucket may periodically adjust as a host device continues to connect to one or more peripheral devices. For example, the host device may determine that a particular live RSSI value is actually a weaker connection than previously recognized, and accordingly associate that live RSSI value with a more distant bucket.

Conversely, the host device may associate a live RSSI value with a stronger signal and thereby associate the peripheral device with a relatively closer bucket. The adjustments may be based on repeated connections with a particular peripheral device or repeated connections with different peripheral devices. In addition, the adjustments may be based on crowd-sourced information, in which multiple host devices are used to learn and adapt based on each other's connections with particular or different peripheral devices.

A host device may leverage the particular type of connected peripheral device and the bucket within which it is located to determine different filters or scenarios to perform. Thus, different filters and bucket parameters may be unique to a given peripheral device and accordingly utilized. For example, buckets may vary for peripheral devices based on a number of buckets employed, defined range within each respective bucket, and filters/scenarios for the host device to perform when a given peripheral device is located in a respective bucket.

FIG. 21 shows exemplary monikers that can be associated with buckets. For example, when the peripheral device is determined to be within X –dBm (e.g., using live RSSI and calibrated RSSI data), which is a defined proximity bucket and expected distance from the host device, the peripheral device can be designated as being at a close-by distance 2105 from the host device. When the peripheral device is determined to be between X and Y –dBm from the host device, the peripheral device can be designated as being within the same room 2110 as the host device. When the peripheral device is determined to be between Y and Z –dBm from the host device, the peripheral device can be designated as being present 2115. When the peripheral device is determined to be beyond Z –dBm from the host device, the peripheral device can be designated as being out of range, switched off, or no longer active 2120. Furthermore, incorporating statistical data obtained through telemetry, these measures of statistical confidence can be utilized as opposed to deterministic (i.e. a high confidence percentage to be located within X, Y, etc.).

In the illustrative FIG. 21, the host device 105 determines that the keyboard-peripheral device, using the advertisement payload data (FIG. 19), is located within the bucket identified as "present" based on the keyboard's determined location 2125. In this example, the host device may be configured to track the keyboard so long as it is present, and therefore may not perform any functions when the keyboard's bucket changes from the close-by distance to the same room. Upon the keyboard reaching "present" status, however, the host device, according to an implemented filter, may surface an alert to the user indicating that the user is almost out of range.

FIG. 22 shows an illustrative environment 2200 where a wireless stylus pen 2210 is beaconing at least to the laptop 2205, and the laptop determines the bucket between the two devices (represented by numeral 2215). Alternatively, the stylus pen and laptop may be connected to each other. The bucket can be identified, whether or not the two devices are actually connected, by using the broadcasted advertisement payload. In the example in which the devices are connected, GATT (Generic Attributes) database or L2CAP (Logical Link Control and Adaptation Protocol) services can be used to retrieve calibration data. In this example, the RSSI value and the wireless connection can be subject to interference due to a lamp 2220, and thereby the quality of the connection reduced. In this situation, although the pen may be within a close-by distance to the laptop, the live RSSI value and the connection may be weaker than expected and thereby the bucket in which the pen is associated changed.

Thus, the laptop-host device may associate the pen within a bucket beyond "close-by," such as "present" as discussed for FIG. 21, due to the altered RSSI value caused by the lamp. In this regard, the buckets can represent usable values for the host device beyond designating particular locations for peripheral devices, but also associating a peripheral device with a useful designation based on the actual strength of the connection between the peripheral and host devices. Other objects, structures, and interferences that obstruct the connection between host and peripheral devices in addition to a lamp are also possible, including bad weather, walls, tables, televisions, and the like.

Figure 23:
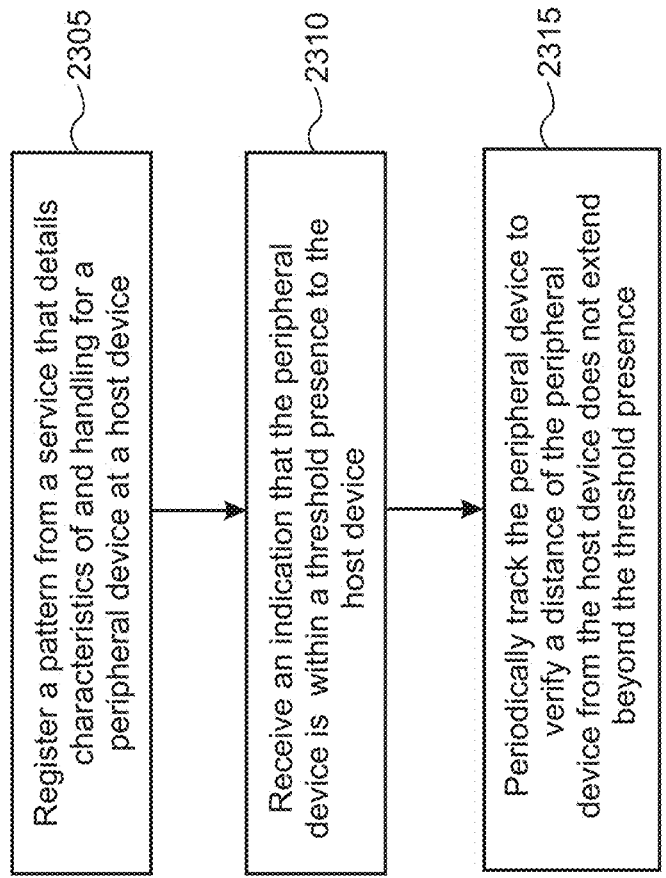
FIGS. 23-25 show illustrative processes performed by the host device and/or the peripheral device.

FIG. 23 is a flowchart of an illustrative method 2300 in which the proximity platform is implemented at the host device. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2305, a pattern from a service is registered at a host computing device. The pattern may detail characteristics of and handling for the peripheral device at the host device. In step 2310, an indication that the peripheral device is within a threshold presence to the host device is received. In step 2315, the host device periodically tracks the peripheral device to at least verify that a distance of the peripheral device from the host device has not extended beyond the threshold presence.

Figure 24:
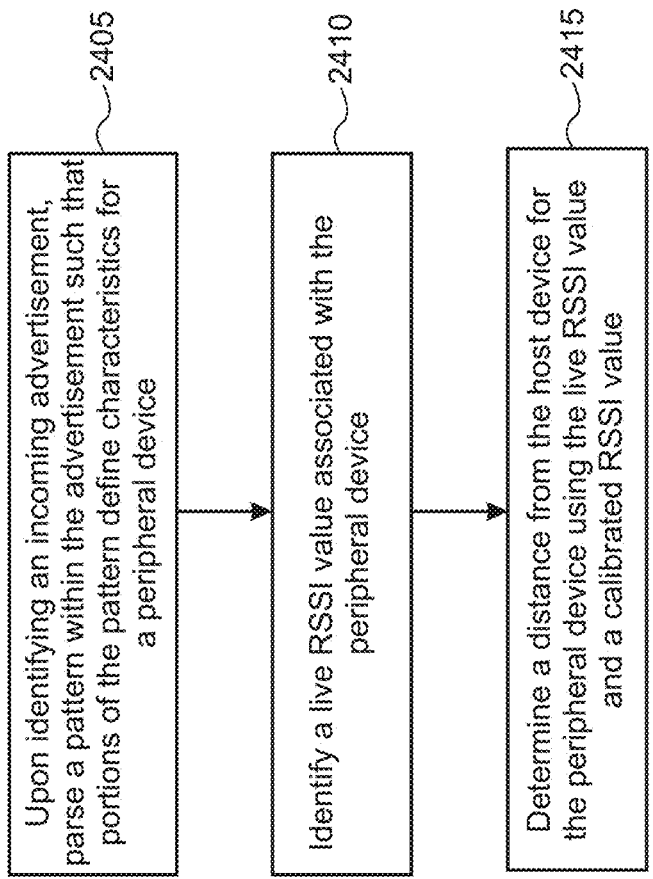

FIG. 24 is a flowchart of an illustrative method 2400 that may be performed by a host device when a point-to-point connection is established between the host device and a peripheral device. In step 2405, upon identifying an incoming advertisement, a pattern within the advertisement is parsed. Portions of the pattern can define characteristics for the peripheral device, such as a manufacturer, company associated with the peripheral device, and the like.

In step 2410, a live RSSI value associated with the peripheral device is identified. The live RSSI value may be measured by the radio receiver upon receipt of the advertisement. In step 2415, a distance from the host device for the peripheral device is determined using the live RSSI value and a calibrated RSSI value. The calibrated RSSI value may have been determined from previous tests between a reference host device and a reference peripheral device, so that any interference due to differences in the devices and system combination (device or system casing material, radio properties, etc.), or other factors that affect a live RSSI value, can be accounted for and taken into consideration.

Figure 25:
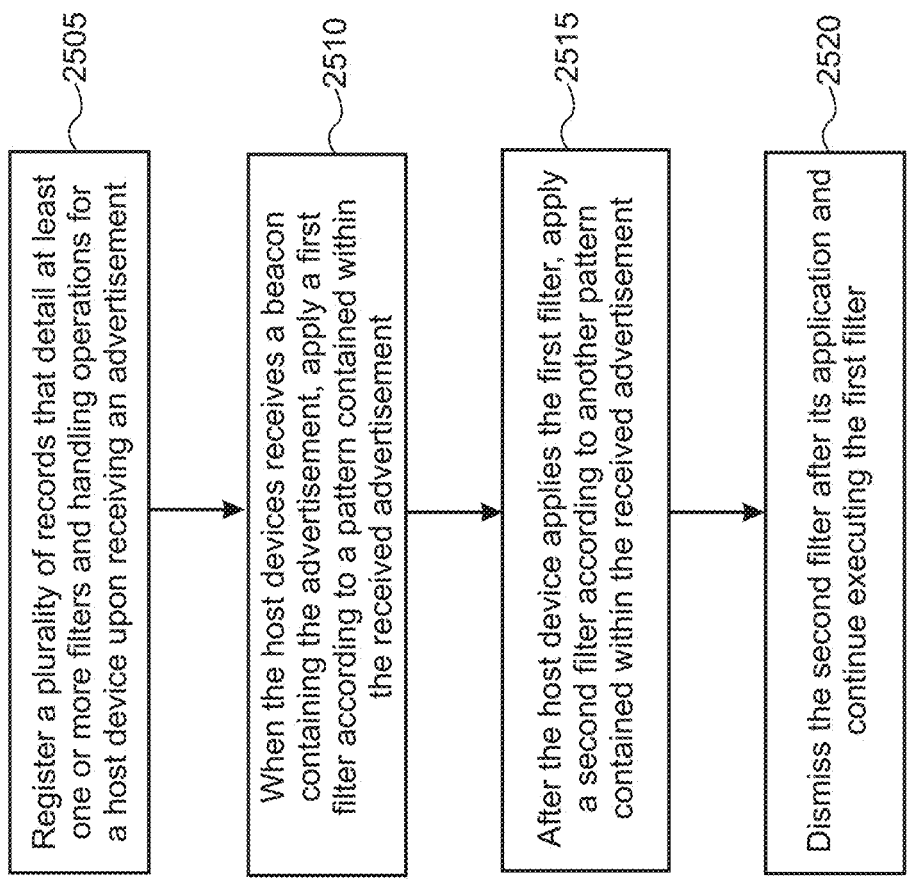

FIG. 25 is a flowchart of an illustrative method 2500 that may be performed by a computing device. In step 2505, a plurality of records that detail at least one or more filters and handling operations for the host device are registered upon receiving an advertisement. In step 2510, a first filter is applied to the peripheral device according to a pattern contained in the received advertisement. In step 2515, after the host device applies the first filter, a second filter is applied to the peripheral device according to another pattern contained in the received advertisement. In step 2520, the second filter is dismissed after its application, but the first filter may continue to execute in this example. The first filter may be maintained, for example, to detect other peripheral devices that include a similar pattern so that the host device can pick up on that pattern. The second filter, however, may be contingent on the first filter, so therefore there is no reason to continue its execution.

Figure 26:
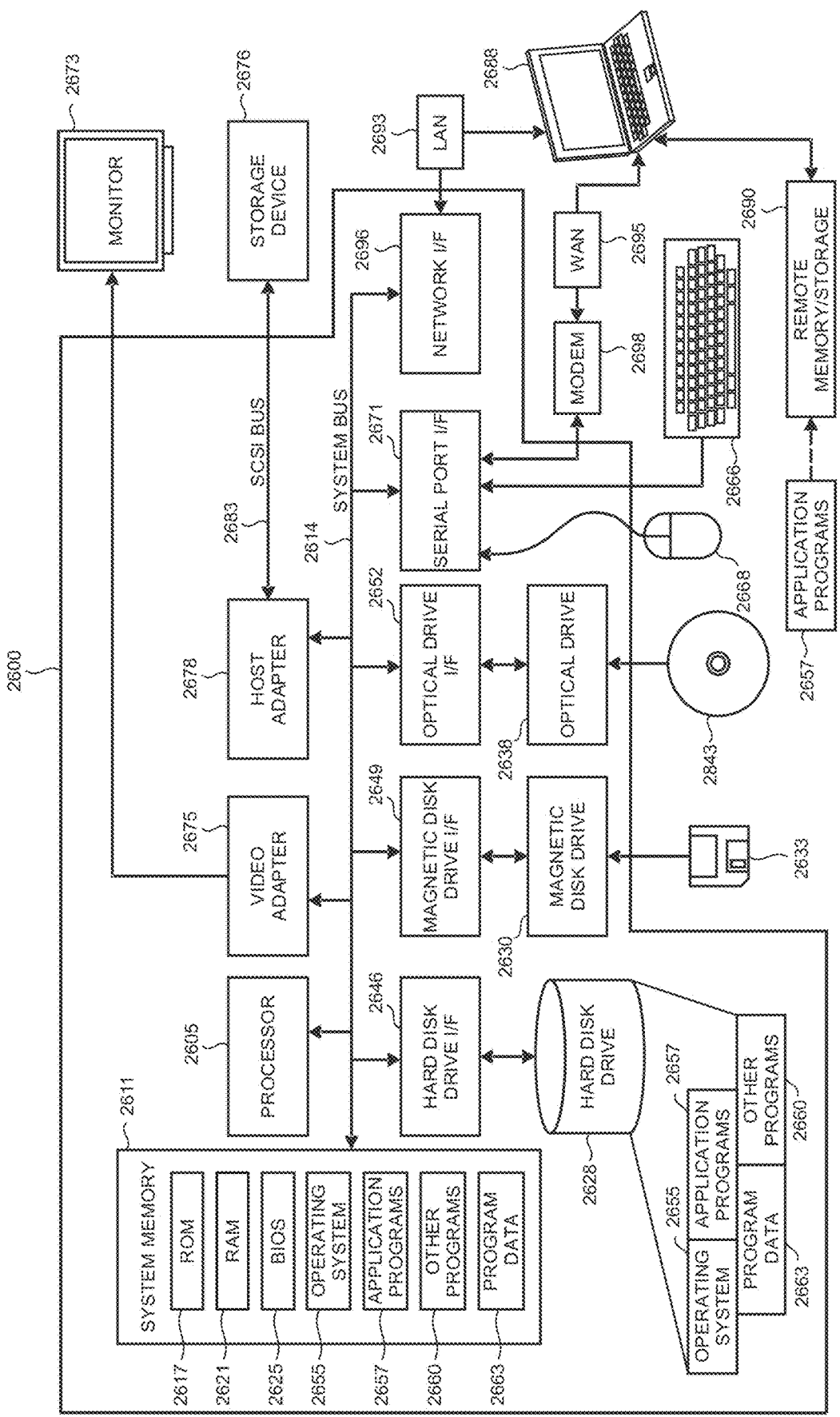
FIG. 26 is a simplified block diagram of an illustrative computer system such as a mobile device that may be used in part to implement the present proximity platform.

FIG. 26 is a simplified block diagram of an illustrative computer system 2600 such as a PC, client machine, or server with which the present proximity platform may be implemented. Computer system 2600 includes a processor 2605, a system memory 2611, and a system bus 2614 that couples various system components including the system memory 2611 to the processor 2605. The system bus 2614 may be any of several types of bus structures including a memory bus or memory controller, a peripheral bus, or a local bus using any of a variety of bus architectures. The system memory 2611 includes read only memory (ROM) 2617 and random access memory (RAM) 2621. A basic input/output system (BIOS) 2625, containing the basic routines that help to transfer information between elements within the computer system 2600, such as during startup, is stored in ROM 2617. The computer system 2600 may further include a hard disk drive 2628 for reading from and writing to an internally disposed hard disk (not shown), a magnetic disk drive 2630 for reading from or writing to a removable magnetic disk 2633 (e.g., a floppy disk), and an optical disk drive 2638 for reading from or writing to a removable optical disk 2643 such as a CD (compact disc), DVD (digital versatile disc), or other optical media. The hard disk drive 2628, magnetic disk drive 2630, and optical disk drive 2638 are connected to the system bus 2614 by a hard disk drive interface 2646, a magnetic disk drive interface 2649, and an optical drive interface 2652, respectively. The drives and their associated computer-readable storage media provide non-volatile storage of computer-readable instructions, data structures, program modules, and other data for the computer system 2600. Although this illustrative example includes a hard disk, a removable magnetic disk 2633, and a removable optical disk 2643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present proximity platform. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk 2628, magnetic disk 2630, optical disk 2638, ROM 2617, or RAM 2621, including an operating system 2655, one or more application programs 2657, other program modules 2660, and program data 2663. A user may enter commands and information into the computer system 2600 through input devices such as a keyboard 2666 and pointing device 2668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2605 through a serial port interface 2671 that is coupled to the system bus 2614, but may be connected by other interfaces, such as a parallel port, game port, or universal serial bus (USB). A monitor 2673 or other type of display device is also connected to the system bus 2614 via an interface, such as a video adapter 2675. In addition to the monitor 2673, personal computers typically include other peripheral output devices (not shown), such as speakers and printers. The illustrative example shown in FIG. 26 also includes a host adapter 2678, a Small Computer System Interface (SCSI) bus 2683, and an external storage device 2676 connected to the SCSI bus 2683.

The computer system 2600 is operable in a networked environment using logical connections to one or more remote computers, such as a remote computer 2688. The remote computer 2688 may be selected as another personal computer, a server, a router, a network PC, a peer device, or other common network node, and typically includes many or all of the elements described above relative to the computer system 2600, although only a single representative remote memory/storage device 2690 is shown in FIG. 26. The logical connections depicted in FIG. 26 include a local area network (LAN) 2693 and a wide area network (WAN) 2695. Such networking environments are often deployed, for example, in offices, enterprise-wide computer networks, intranets, and the Internet.

When used in a LAN networking environment, the computer system 2600 is connected to the local area network 2693 through a network interface or adapter 2696. When used in a WAN networking environment, the computer system 2600 typically includes a broadband modem 2698, network gateway, or other means for establishing communications over the wide area network 2695, such as the Internet. The broadband modem 2698, which may be internal or external, is connected to the system bus 2614 via a serial port interface 2671. In a networked environment, program modules related to the computer system 2600, or portions thereof, may be stored in the remote memory storage device 2690. It is noted that the network connections shown in FIG. 26 are illustrative and other means of establishing a communications link between the computers may be used depending on the specific requirements of an application of the present proximity platform.

Figure 27:
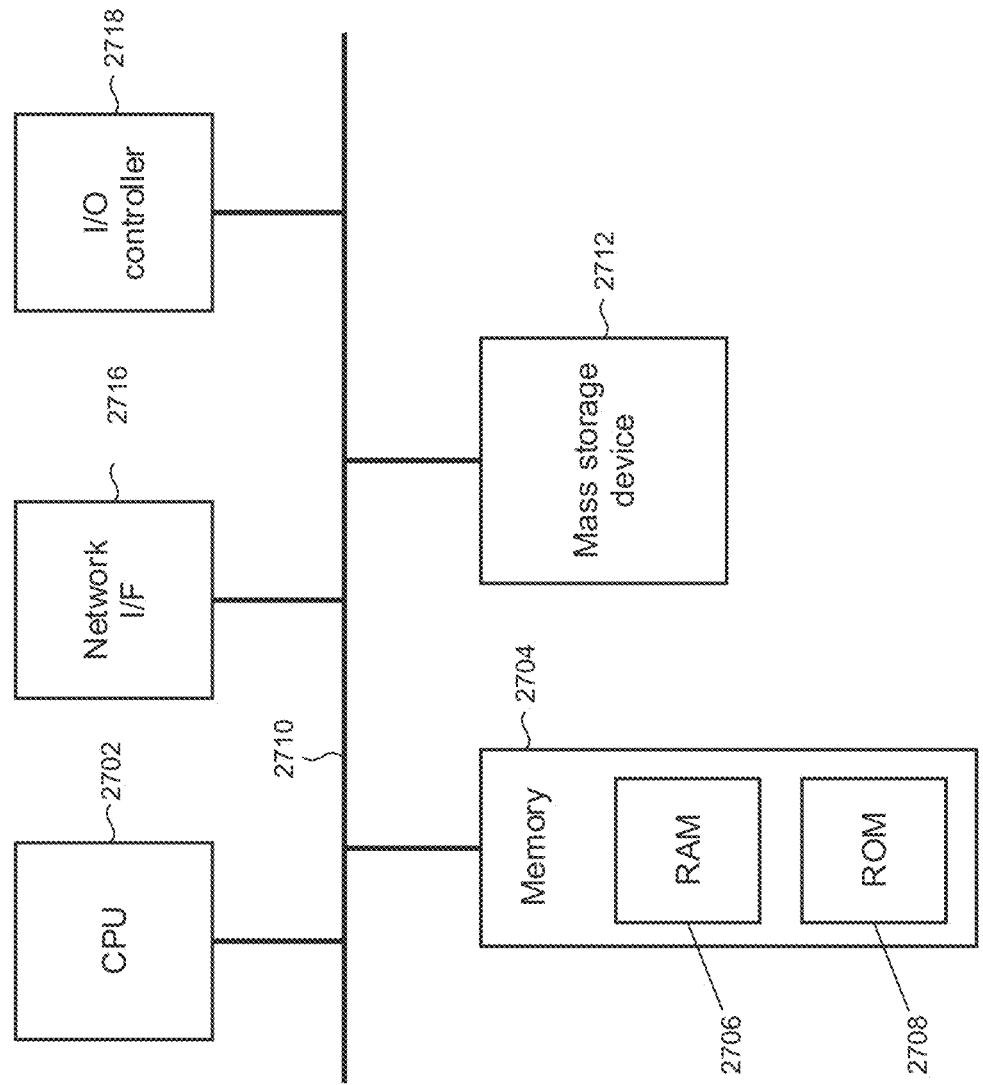
FIG. 27 shows a block diagram of an illustrative device that may be used in part to implement the present proximity platform.

FIG. 27 shows an illustrative architecture 2700 for a device capable of executing the various components described herein for the proximity platform. Thus, the architecture 2700 illustrated in FIG. 27 shows an architecture that may be adapted for a server computer, mobile phone, a PDA, a smartphone, a desktop computer, a netbook computer, a tablet computer, GPS device, gaming console, and/or a laptop computer. The architecture 2700 may be utilized to execute any aspect of the components presented herein.

The architecture 2700 illustrated in FIG. 27 includes a CPU (Central Processing Unit) 2702, a system memory 2704, including a RAM 2706 and a ROM 2708, and a system bus 2710 that couples the memory 2704 to the CPU 2702. A basic input/output system containing the basic routines that help to transfer information between elements within the architecture 2700, such as during startup, is stored in the ROM 2708. The architecture 2700 further includes a mass storage device 2712 for storing software code or other computer-executed code that is utilized to implement applications, the file system, and the operating system.

The mass storage device 2712 is connected to the CPU 2702 through a mass storage controller (not shown) connected to the bus 2710. The mass storage device 2712 and its associated computer-readable storage media provide non-volatile storage for the architecture 2700.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2700.

According to various embodiments, the architecture 2700 may operate in a networked environment using logical connections to remote computers through a network. The architecture 2700 may connect to the network through a network interface unit 2716 connected to the bus 2710. It may be appreciated that the network interface unit 2716 also may be utilized to connect to other types of networks and remote computer systems. The architecture 2700 also may include an input/output controller 2718 for receiving and processing input from a number of other devices, including a keyboard, mouse, or electronic stylus (not shown in FIG. 27). Similarly, the input/output controller 2718 may provide output to a display screen, a printer, or other type of output device (also not shown in FIG. 27).

It may be appreciated that the software components described herein may, when loaded into the CPU 2702 and executed, transform the CPU 2702 and the overall architecture 2700 from a general-purpose computing system into a special-purpose computing system customized to facilitate the functionality presented herein. The CPU 2702 may be constructed from any number of transistors or other discrete circuit elements, which may individually or collectively assume any number of states. More specifically, the CPU 2702 may operate as a finite-state machine, in response to executable instructions contained within the software modules disclosed herein. These computer-executable instructions may transform the CPU 2702 by specifying how the CPU 2702 transitions between states, thereby transforming the transistors or other discrete hardware elements constituting the CPU 2702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2700 in order to store and execute the software components presented herein. It also may be appreciated that the architecture 2700 may include other types of computing devices, including handheld computers, embedded computer systems, smartphones, and PDAs known to those skilled in the art. It is also contemplated that the architecture 2700 may not include all of the components shown in FIG. 27, may include other components that are not explicitly shown in FIG. 27, or may utilize an architecture completely different from that shown in FIG. 27.

Figure 28:
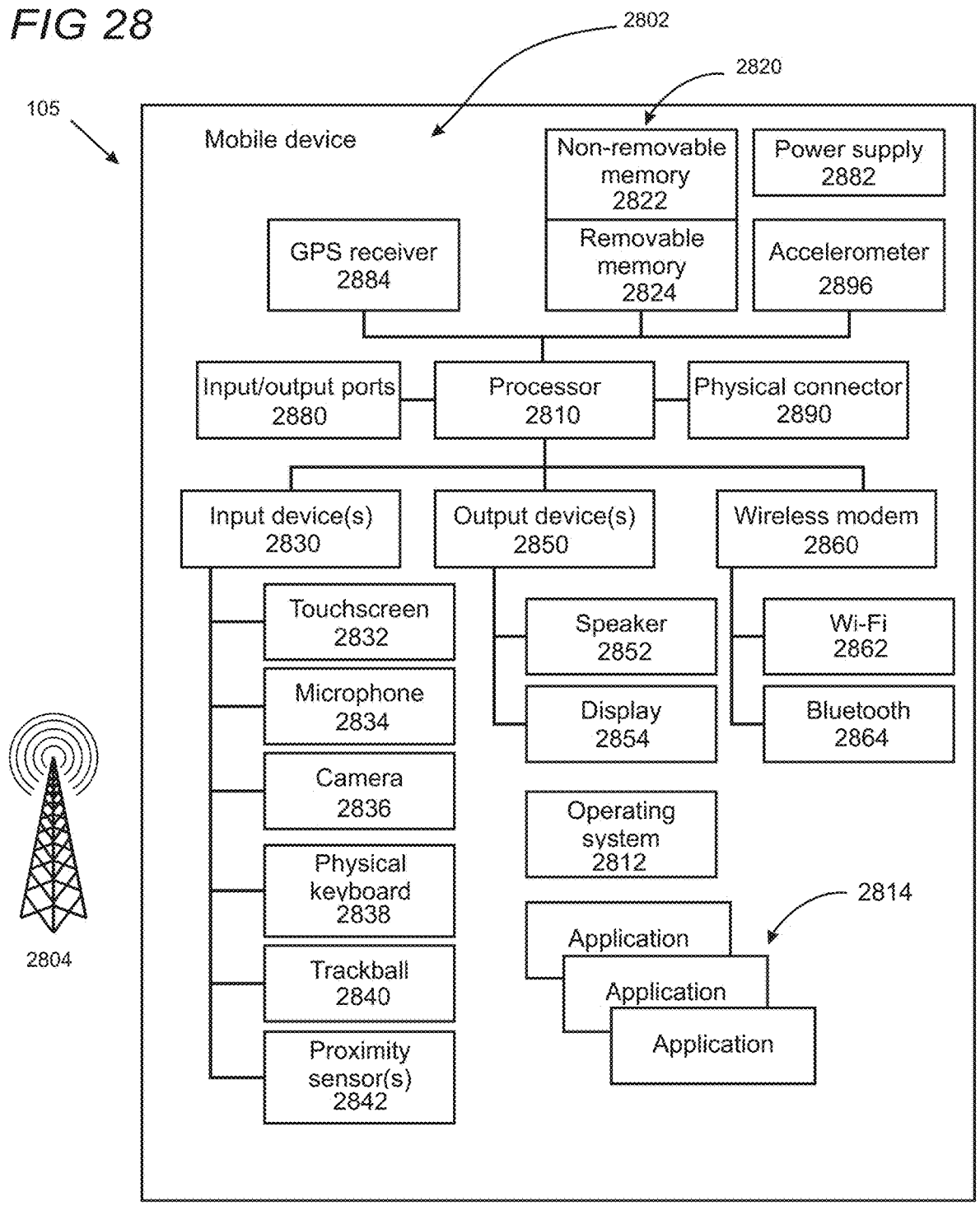
FIG. 28 shows a block diagram of an illustrative host or peripheral computing device that may be used to implement the present proximity platform.

FIG. 28 is a functional block diagram of an illustrative host computing device 105 such as a mobile phone or smartphone including a variety of optional hardware and software components, shown generally at 2802. Any component 2802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2804, such as a cellular or satellite network.

The illustrated device 105 can include a controller or processor 2810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2812 can control the allocation and usage of the components 2802, including power states, above-lock states, and below-lock states, and provides support for one or more application programs 2814. The application programs can include common mobile computing applications (e.g., image-capture applications, e-mail applications, calendars, contact managers, web browsers, messaging applications), or any other computing application.

The illustrated device 105 can include memory 2820. Memory 2820 can include non-removable memory 2822 and/or removable memory 2824. The non-removable memory 2822 can include RAM, ROM, Flash memory, a hard disk, or other well-known memory storage technologies. The removable memory 2824 can include Flash memory or a Subscriber Identity Module (SIM) card, which is well known in GSM (Global System for Mobile communications) systems, or other well-known memory storage technologies, such as "smart cards." The memory 2820 can be used for storing data and/or code for running the operating system 2812 and the application programs 2814. Example data can include web pages, text, images, sound files, video data, or other data sets to be sent to and/or received from one or more network servers or other devices via one or more wired or wireless networks.

The memory 2820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 105.

The memory 2820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 105 can support one or more input devices 2830—such as a touchscreen 2832; microphone 2834 for implementation of voice input for voice recognition, voice commands and the like; camera 2836; physical keyboard 2838; trackball 2840; and/or proximity sensor 2842; and one or more output devices 2850—such as a speaker 2852 and one or more displays 2854. Other input devices (not shown) using gesture recognition may also be utilized in some cases. Other possible output devices (not shown) can include piezoelectric or haptic output devices. Some devices can serve more than one input/output function. For example, touchscreen 2832 and display 2854 can be combined into a single input/output device.

A wireless modem 2860 can be coupled to an antenna (not shown) and can support two-way communications between the processor 2810 and external devices, as is well understood in the art. The modem 2860 is shown generically and can include a cellular modem for communicating with the mobile communication network 2804 and/or other radio-based modems (e.g., Bluetooth 2864 or Wi-Fi 2862). The wireless modem 2860 is typically configured for communication with one or more cellular networks, such as a GSM network for data and voice communications within a single cellular network, between cellular networks, or between the device and a public switched telephone network (PSTN).

The device can further include at least one input/output port 2880, a power supply 2882, a satellite navigation system receiver 2884, such as a GPS receiver, an accelerometer 2896, a gyroscope (not shown), and/or a physical connector 2890, which can be a USB port, IEEE 1394 (FireWire) port, and/or an RS-232 port. The illustrated components 2802 are not required or all-inclusive, as any components can be deleted and other components can be added.

Various exemplary embodiments of the present proximity platform are now presented by way of illustration and not as an exhaustive list of all embodiments. An example includes a method for executing scenarios on a host device based on proximity to a peripheral device, in which the host device includes a wireless communication device to at least monitor beaconing from the peripheral device, the method comprising: registering a pattern from a service that details characteristics of and handling for the peripheral device at the host device; receiving an indication that the peripheral device is within a threshold presence to the host device; responsively to receiving the indication, periodically tracking the peripheral device to verify a distance of the peripheral device from the host device has not extended beyond the threshold presence.

In another example, the pattern includes fields, each field representing one or more of the characteristics or handling details for the peripheral device upon the peripheral device connecting or beaconing to the host device. As another example, the fields of the pattern include filters that specify the handling for the peripheral device, such that the periodic tracking of the peripheral device includes verifying that the one or more filters are consistently satisfied while the peripheral device is connected or beaconing to the host device. In another example, the fields represent a manufacturer associated with the peripheral device, a scenario for the peripheral device, and a sub-scenario for the peripheral device, wherein the scenario indicates an action to perform and the sub-scenario provides additional details about the action to perform. In another example, the connection or beaconing from the peripheral device to the host devices is according to Bluetooth protocols. In a further example, the method can include receiving an advertisement transmission from the peripheral device when the peripheral device is within the threshold presence to the host device; matching the advertisement transmission to the registered pattern to determine which actions to perform for the peripheral device. In another example, the method can include registering a plurality of patterns with a plurality of respective services, in which each pattern specifies characteristics and handling for a particular peripheral device, group of peripheral devices, or category of peripheral devices.

Another example includes a computing devices comprised of a wireless communication device that periodically monitors for incoming advertisement transmissions; one or more processors in communication with the wireless communication device; and one or more non-transitory hardware-based memory devices storing computer-readable instructions which, when executed by the one or more processors, cause the computing device to: upon identifying an incoming advertisement, parse a pattern within the incoming advertisement such that portions of the pattern define characteristics for a peripheral device associated with the incoming advertisement; identify a live RSSI (Received Signal Strength Indication) value associated with the peripheral device; and determine a distance from the computing device for the peripheral device using the live RSSI value and a calibrated RSSI value for the peripheral device, in which the calibrated RSSI value accounts for varying characteristics associated with live connections between computing devices and the peripheral device.

As another example, the determined distance is further based on a set distance which was used to obtain the calibrated RSSI value. In another example, the calibrated RSSI value is based on previous measurements between a different, related peripheral device that corresponds to the peripheral device against a reference host device, such that determining the distance using the calibrated RSSI value and the live RSSI value indicates one or more of a distance between the peripheral device and the computing device or a particular distal parameter. As another example, the computer-readable instructions further cause the computing device to: establish buckets for the peripheral device, the buckets representing defined distances from the computing device or distal categories that at least partially represent a defined distance from the computing device; project a distance for the peripheral device from the computing device using one or both of the calibrated RSSI value or the RSSI value; and identify a bucket for the peripheral device based on the projected distance. In another example, the established buckets for the peripheral device are based on one or more of previous connections or previous calibrations between a host device and one or more corresponding peripheral devices, or previously received advertisements from the one or more corresponding peripheral devices to the computing device. As another example, the established buckets are adjusted using the previous connections, previous calibrations, or previously received advertisements. As another example, the computer-readable instructions further cause the computing device to: track the peripheral device using a subsequent RSSI value; identify a subsequent bucket for the peripheral device based on the subsequent RSSI value; and perform an action when the identified subsequent bucket for the peripheral device changes from the previously identified bucket. As another example, the peripheral device includes headphones, keyboard, mouse, speaker, camera, display, or printer.

In another exemplary embodiment, one or more non-transitory hardware-based computer-readable memory devices store instructions which, when executed by one or more processors disposed in a host device, cause the host device to: register a plurality of records that detail at least one or more filters and handling operations for the host device upon receiving an advertisement, wherein the records are respectively associated with a service or application from a plurality of services or applications executing on the host device; and when the host device receives a beacon, apply a first filter, wherein the applied first filter corresponds to a pattern contained within the received advertisement.

As another example, one service or application is associated with two or more records of the plurality of records. As another example, after the host device applies the first filter, the instructions further cause the host device to apply a second filter using another pattern contained within the received advertisement. In another example, the instructions further cause the host device to dismiss the second filter after its application, and continue executing the first filter to detect additional advertisements. In another example, one or both of the first and second filters include sub-filters which further define an applicable action for the host device to perform based on the advertisement.

In another exemplary embodiment, a peripheral computing device configured with point-to-point short-range connection capabilities, comprising: a wireless communication device configured to broadcast an advertisement to external devices; one or more processors in communication with the wireless communication device; and one or more non-transitory hardware-based memory devices storing a data packet structure for the wireless communication device, and further storing computer-readable instructions executable by the one or more processors, wherein the data packet structure includes a PDU (Protocol Data Unit) that includes a header and a payload, the payload of which is modified to include a first field defining an actionable scenario and a second field defining a sub-scenario associated with the actionable scenario.

In another exemplary embodiment, the first and second fields include pre-defined octet patterns. In another example, the actionable scenario indicates to external devices that the peripheral device is configured to quick pair with an external device, such that the peripheral device's beacon patterns are pre-registered within the OS (Operating System) of the external device and the peripheral device is ready for pairing. As another example, pre-registration of the peripheral device at the external device's OS includes storing one or more patterns associated with the peripheral device, such that the OS automatically recognizes handling operations for the peripheral device upon the one or more patterns corresponding to patterns within the first and second fields. In another example, detection of quick pair for the peripheral device that is in range causes the OS of the external device to automatically prompt on a user interface (UI) thereof an opportunity for a user to connect the peripheral device to the external device. As another example, the computer-readable instructions further cause the one or more processors to pair the peripheral device to the external device upon input confirmation from a user. In another example, the wireless communication device utilizes one or more of Bluetooth, NFC (Near Field Communication), or Wi-Fi.

Another embodiment includes a computing device, comprising: a transceiver that periodically monitors for incoming advertisement transmissions; one or more processors in communication with the transceiver; one or more non-transitory hardware-based memory devices storing computer-readable instructions which, when executed by the one or more processors, cause the computing device to: upon receiving an incoming advertisement transmission, compare a pattern within the advertisement transmission with pre-registered records of patterns and measure if a peripheral device is within range; and based on the comparison, identify a quick pair scenario, wherein the quick pair scenario causes the computing device to recognize that a peripheral device associated with the transmission of the advertisement is seeking to quick pair with the computing device, thereby causing the computing device to automatically surface, on a user interface (UI) of a display of the computing device, a toast that provides the user with an option to establish a wireless connection with the peripheral device.

As another example, the computer-readable instructions further cause the computing device to: receive user input to connect to the peripheral device; and establish the wireless connection with the peripheral device responsive to the input. As another exemplary example, the computer-readable instructions further cause the computing device to: monitor for user interaction at the toast for a predetermined period of time; and after the predetermined period of time expires, move the toast into an action center which enables the user to quick pair the peripheral device to the computing device at a later time. As a further example, the computer-readable instructions further cause the computing device to: monitor for beaconing from the peripheral device; and maintain the toast in the action center while beaconing is detected at the computing device. As another example, the computer-readable instructions further cause the computing device to: monitor for beaconing from the peripheral device; determine whether the toast is stale; and based on the determination that the toast is stale, remove the toast from the notification center. In another example, the computer-readable instructions further cause the computing device to: continue to monitor for beaconing from the peripheral device; and when the beaconing from the peripheral device is detected again, re-surface the toast on the UI or the notification center. As another example, the peripheral device is stale based on one or more of a location of the peripheral device extending beyond a threshold distance, the peripheral device is switched off, a presence or absence of a specific pattern in the beaconing, or a payload has been removed from the advertisement. In another example, the computer-readable instructions further cause the computing device to: apply a primary filter according to a quick pair scenario, in which the primary filter causes the computing device to passively scan for advertisements from the peripheral device; and apply a secondary filter according, in which the secondary filter causes the computing device to passively scan for the presence or absence of the peripheral device using an address contained within the advertisement.

Another exemplary embodiment includes one or more non-transitory hardware-based computer-readable memory devices storing instructions which, when executed by one or more processors disposed in a host device, cause the host device to: receive a pattern, in which the pattern is initially retrieved at a wireless communication device associated with the host device; parse the pattern to identify information contained within the pattern, wherein the information within the pattern indicates a manufacturer, quick pair enabled and an associated application; and responsive to a user's permission, download the application over a network based on the information derived from the pattern.

In another example, the information contained within the pattern is for an external computing device not yet associated with the host device. As another example, surfacing a toast to the user that the application is available to download for the peripheral device, in which the application is downloaded in response to an input from the user. In another example, the application is automatically trusted by the host device upon downloading based on the application being identified and downloaded according to the advertisement payload. In another example, the peripheral device is any one of headphones, keyboard, mouse, speaker, camera, display, or printer.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method for executing scenarios on a host device based on proximity to a peripheral device, in which the host device includes a wireless communication device to at least monitor beaconing from the peripheral device, the method comprising:
   prior to connecting with the peripheral device, registering a pattern from a service distinct from the peripheral device that indicates one of a plurality of predetermined scenarios for execution by the host device to handle the peripheral device;

subsequent to registering the pattern from the service, receiving an advertisement from the peripheral device having a payload that includes a pattern from the peripheral device;

comparing the advertised pattern from the peripheral device to the registered pattern to identify a predetermined scenario;

receiving an indication that the peripheral device is within a threshold presence to the host device; and responsively to receiving the indication, executing the identified predetermined scenario by periodically tracking the peripheral device to verify that a distance of the peripheral device from the host device has not extended beyond the threshold presence.

2. The method of claim 1, in which the pattern includes fields, each field representing one or more of the characteristics or handling details for the peripheral device upon the peripheral device connecting or beaconing to the host device.

3. The method of claim 2, in which the fields of the pattern include at least filters that specify the handling for the peripheral device, such that the periodic tracking of the peripheral device includes verifying that the one or more filters are consistently satisfied while the peripheral device is connected or beaconing to the host device.

4. The method of claim 2, in which the fields of the pattern represent a manufacturer associated with the peripheral device, a scenario for the peripheral device, and a sub-scenario for the peripheral device, wherein the scenario indicates an action to perform and the sub-scenario provides additional details about the action to perform.

5. The method of claim 3, in which the connection or beaconing from the peripheral device to the host devices is according to Bluetooth protocols.

6. The method of claim 1, further comprising:

receiving an advertisement transmission from the peripheral device when the peripheral device is within the threshold presence to the host device; and matching the advertisement transmission to the registered pattern to determine which actions to perform for the peripheral device.

7. The method of claim 1, further comprising registering a plurality of patterns for a plurality of respective services, in which each pattern specifies characteristics and handling for a particular peripheral device, group of peripheral devices, or category of peripheral devices.

* * * * *